US012519382B2

(12) United States Patent
Into et al.

(10) Patent No.: US 12,519,382 B2
(45) Date of Patent: Jan. 6, 2026

(54) TWO-AXIS-MOTION FROM A LINEAR ACTUATOR

(71) Applicant: Onto Innovation Inc., Wilmington, DE (US)

(72) Inventors: Stephen W. Into, Hudson, NH (US); Gregory William Weiss, Billerica, MA (US)

(73) Assignee: Onto Innovation Inc., Wilmington, MA (US)

( * ) Notice: Subject to any disclaimer, the term of this patent is extended or adjusted under 35 U.S.C. 154(b) by 0 days.

(21) Appl. No.: 18/573,959

(22) PCT Filed: Nov. 29, 2023

(86) PCT No.: PCT/US2023/081615
§ 371 (c)(1),
(2) Date: Dec. 22, 2023

(87) PCT Pub. No.: WO2024/118786
PCT Pub. Date: Jun. 6, 2024

(65) Prior Publication Data
US 2025/0279710 A1    Sep. 4, 2025

Related U.S. Application Data

(60) Provisional application No. 63/545,815, filed on Oct. 26, 2023, provisional application No. 63/385,356, filed on Nov. 29, 2022.

(51) Int. Cl.
*B25J 9/12* (2006.01)
*H02K 41/035* (2006.01)

(52) U.S. Cl.
CPC .......... *H02K 41/0354* (2013.01); *B25J 9/123* (2013.01); *H02K 2201/18* (2013.01)

(58) Field of Classification Search
CPC .. H02K 41/0354; H02K 2201/18; B25J 9/123
(Continued)

(56) References Cited

U.S. PATENT DOCUMENTS

2012/0121371 A1    5/2012   Aenis et al.
2014/0084699 A1    3/2014   Sugino et al.

FOREIGN PATENT DOCUMENTS

CN    115085508     9/2022
JP    2007216307    8/2007
(Continued)

OTHER PUBLICATIONS

"International Application Serial No. PCT US2023 081615, International Search Report mailed Mar. 28, 2024", 4 pages.
(Continued)

*Primary Examiner* — T. Scott Fix
(74) *Attorney, Agent, or Firm* — Schwegman Lundberg & Woessner, P.A.

(57) ABSTRACT

Various examples include an apparatus to provide motion in at least two linear-axes, where each of the linear-axes are substantially orthogonal to one another. The apparatus can include a load stage having a first actuator (e.g., a modified linear-motor) coupled to the load stage to provide a linear motion to the load stage in a first direction. A wide-magnet pack is coupled to or included as a portion of the first actuator. The wide-magnet pack has a width sufficient to allow movement of the load stage in a second direction without impairing the linear motor operation, the second direction being substantially orthogonal to the first direction. A second actuator is also coupled to the load stage to provide the linear motion in the second direction, substantially within magnetic-field constraints of the wide-magnet pack. Other systems, apparatuses, and devices are also disclosed.

20 Claims, 12 Drawing Sheets

(58) Field of Classification Search
USPC .................................................... 74/490.08
See application file for complete search history.

(56) References Cited

FOREIGN PATENT DOCUMENTS

| KR | 20070022722 | 2/2007 |
| KR | 20120137662 | 12/2012 |
| TW | 201231209 | 8/2012 |
| TW | 202429876 | 7/2024 |
| WO | 2024118786 | 6/2024 |

OTHER PUBLICATIONS

"International Application Serial No. PCT US2023 081615, Written Opinion mailed Mar. 28, 2024", 5 pages.
"Taiwanese Application Serial No. 112146359, Response filed Jan. 6, 2025 to Office Action mailed Jul. 4, 2024", with English claims, 12 pages.
"International Application Serial No. PCT US2023 081615, International Preliminary Report on Patentability mailed Jun. 12, 2025", 7 pages.
"Taiwanese Application Serial No. 112146359, Office Action mailed Jul. 4, 2024", with manual English translation, 21 pages.

TWO-AXIS-MOTION FROM A LINEAR ACTUATOR

CLAIM OF PRIORITY

This application is a U.S. National-Phase Filing under 35 U.S.C. § 371 from International Application No. PCT/US2023/081615, filed on 29 Nov. 2023, and entitled, "TWO-AXIS-MOTION FROM A LINEAR ACTUATOR," which claims the priority benefit to U.S. Provisional Patent Application Ser. No. 63/385,356, filed on 29 Nov. 2022, and entitled "TWO-AXIS-MOTION FROM A LINEAR ACTUATOR," as well as U.S. Provisional Patent Application Ser. No. 63/545,815, filed on 26 Oct. 2023, and entitled "BELL-CRANK ASSEMBLY TO PROVIDE DIRECTIONAL MOTION," each of which is incorporated by reference herein in its entirety.

TECHNOLOGY FIELD

The disclosed subject matter is related generally to the field of movement of equipment and devices in various physical directions, such as three-dimensional printing and other applications, as well as lithography, substrate-inspection, and metrology tools used in the semiconductor and allied industries (e.g., flat-panel display and solar-cell production facilities). More specifically, in various embodiments, the disclosed subject matter is related to a two-axis linear actuator used to transport various types of inspection and metrology tools in two or more directions, including x-, y-, z-, and theta-directions with reference to a substrate situated below the linear actuator. In other embodiments, the disclosed subject-matter relates to a linear-motion system to control a height of a load stage in a z-direction (e.g., above a substrate situated below the load stage) with substantially no tilt or other theta-rotation of the load stage.

BACKGROUND

Current linear-motion systems typically use independent motion and bearing systems to provide positioning in two or more directions. These linear-motion systems often include a linear-motion x-axis table and a separate linear-motion y-axis table, mounted to the x-axis table, to provide x-y positioning capabilities. Additionally, a theta-rotation stage is frequently mounted to the combination x-axis and y-axis tables to provide movement of a load (e.g., a substrate, components of a metrology tool, an optical system, etc.) in an x-direction, a z-direction, and a theta-rotation direction.

Additionally, current types of linear-motion systems often encounter problems with keeping load stages (e.g., to which various types of optical metrology and other devices may be mounted) moving straight and in-line at speeds encountered in high-speed operations such as in metrology, overlay, characterization, and/or inspection equipment.

What is needed is a lightweight apparatus that does not use a separate linear-motion x-axis table and a separate linear-motion y-axis table to provide positioning of the load. Various embodiments of the disclosed subject matter can provide motion in at least two axes (e.g., linear or rotary) within an actuator (e.g., a single linear-actuator). The same single linear-actuator can also provide motion in a theta-rotation direction.

Further, various embodiments disclose an apparatus to provide motion to a load stage that is configured to hold, for example, optical components, as is used for various types of equipment such as metrology, overlay, characterization, and/or inspection equipment, as the load stage passes over a substrate (e.g., a semiconductor substrate, a flat-panel display, a panel, a wafer, etc.). Consequently, in various embodiments, the disclosed subject-matter is configured to move the load stage in a z-direction (e.g., a first-direction, with reference to the substrate, with substantially no tilt or other theta-rotation from a chosen z-height, while allowing other linear actuators to move the load stage in an x-direction and a y-direction (e.g., second-direction and third-direction, respectively).

SUMMARY

This document describes, among other things, an apparatus to provide motion in at least two axes, where each of the linear-axes are substantially orthogonal to one another. In various embodiments, the apparatus can also include a theta rotational-stage. The apparatus can include a load stage having a first actuator (e.g., a modified linear-motor) coupled to the load stage to provide a linear motion to the load stage in a first direction. A wide-magnet pack is coupled to or included as a portion of the first actuator. The wide-magnet pack has a width sufficient to allow movement of the load stage in a second direction, which is substantially orthogonal to the first direction. A second actuator is also coupled to the load stage to provide the linear motion in the second direction, substantially within the constraints of the wide-magnet pack. As described in more detail herein, the second actuator is arranged to provide at least one of a linear motion and a rotary motion to the load stage in the second direction by moving the load stage in the second direction using, for example, one or more linear actuators or one or more voice-coil motors.

Additionally, various embodiments disclosed herein can provide motion to a load stage that is configured to hold, for example, optical components, as is used for various types of equipment such as metrology, overlay, characterization, and/or inspection equipment, as the load stage passes over a substrate (e.g., a semiconductor substrate, a flat-panel display, a panel, a wafer, etc.).

In various embodiments, the disclosed subject matter is an apparatus to provide motion in at least two linear-axes, each of the at least two linear-axes being substantially orthogonal to one another. The apparatus includes a load stage. A first actuator is coupled to the load stage to provide a linear motion to the load stage in a first direction. A wide-magnet pack is coupled within the first actuator. The wide-magnet pack has a width sufficient to allow movement of the load stage in a direction substantially orthogonal to the first direction. At least one second actuator is also coupled to the load stage to provide at least one of a linear motion and a rotary motion to the load stage in a second direction that is substantially orthogonal to the first direction.

In various embodiments, the disclosed subject matter is an apparatus to provide motion in at least two linear-axes, each of the at least two linear-axes being substantially orthogonal to one another. The apparatus includes a load stage having a mounting plate and a first linear-motor configured to provide a linear motion to the load stage in a first direction. The first linear-motor includes a magnet pack and a coil-bearing plate. The coil-bearing plate is coupled to the mounting plate of the load stage and is substantially surrounded on at least two sides by the magnet pack. The coil-bearing plate is arranged to move the load stage in at least the first direction via a magnetic field generated within the first linear-motor. The application further includes at least one second actuator coupled to the load stage. The at least one second actuator is to provide at least a linear motion to the load stage in a second direction that is substantially orthogonal to the first direction.

In various embodiments, the disclosed subject matter is an apparatus to provide motion in at least two linear-axes, each of the at least two linear-axes being substantially orthogonal to one another. The apparatus includes a first linear-motor to provide a linear motion in a first direction. The first linear-motor includes a magnet pack and a coil-bearing plate. The coil-bearing plate is substantially surrounded on at least two sides by the magnet pack. The coil-bearing plate is arranged to move in at least the first direction via a magnetic field generated within the first linear-motor.

In various embodiments, the disclosed subject-matter is configured to move the load stage in a z-direction (e.g., a first-direction, with reference to the substrate, with substantially no tilt or other theta-rotation from a chosen z-height, while allowing other linear actuators to move the load stage in an x-direction and a y-direction (e.g., second-direction and third-direction, respectively).

In various embodiments, the disclosed subject-matter is an apparatus to provide motion to a load stage in a first-direction while simultaneously allowing motion of the load stage in a second-direction and a third-direction. The apparatus includes a shaft to apply a torque to the load stage; one or more z-direction load-stage actuators mechanically coupled to the shaft to adjust a height of the load stage above a workpiece. A motion actuator is mechanically coupled to the shaft and located proximate to the one or more z-direction load-stage actuators to apply a force on the shaft.

In various embodiments, the disclosed subject-matter is an apparatus to provide motion to a load stage in a first-direction while simultaneously allowing motion of the load stage in a second-direction and a third-direction, each of the directions being substantially orthogonal to one another. The apparatus includes a shaft to apply a torque to the load stage; at least one pair of z-direction load-stage actuators mechanically coupled to each other and mounted on opposing ends of the shaft, the at least one pair of z-direction load-stage actuators to adjust a height of the load stage above a substrate; and a motion actuator located between the at least one pair of z-direction load-stage actuators. The motion actuator is configured to apply a force on the shaft in a direction substantially transverse to a direction of a force applied to the load stage by the at least one pair of z-direction load-stage actuators. A bell-crank assembly is coupled between the motion actuator and the shaft. The bell-crank assembly is configured to supply the force to the shaft to apply the torque to the at least one pair of z-direction load-stage actuators.

BRIEF DESCRIPTION OF FIGURES

Various ones of the appended drawings merely illustrate example implementations of the present disclosure and should not be considered as limiting its scope.

DETAILED DESCRIPTION

Figure 1:
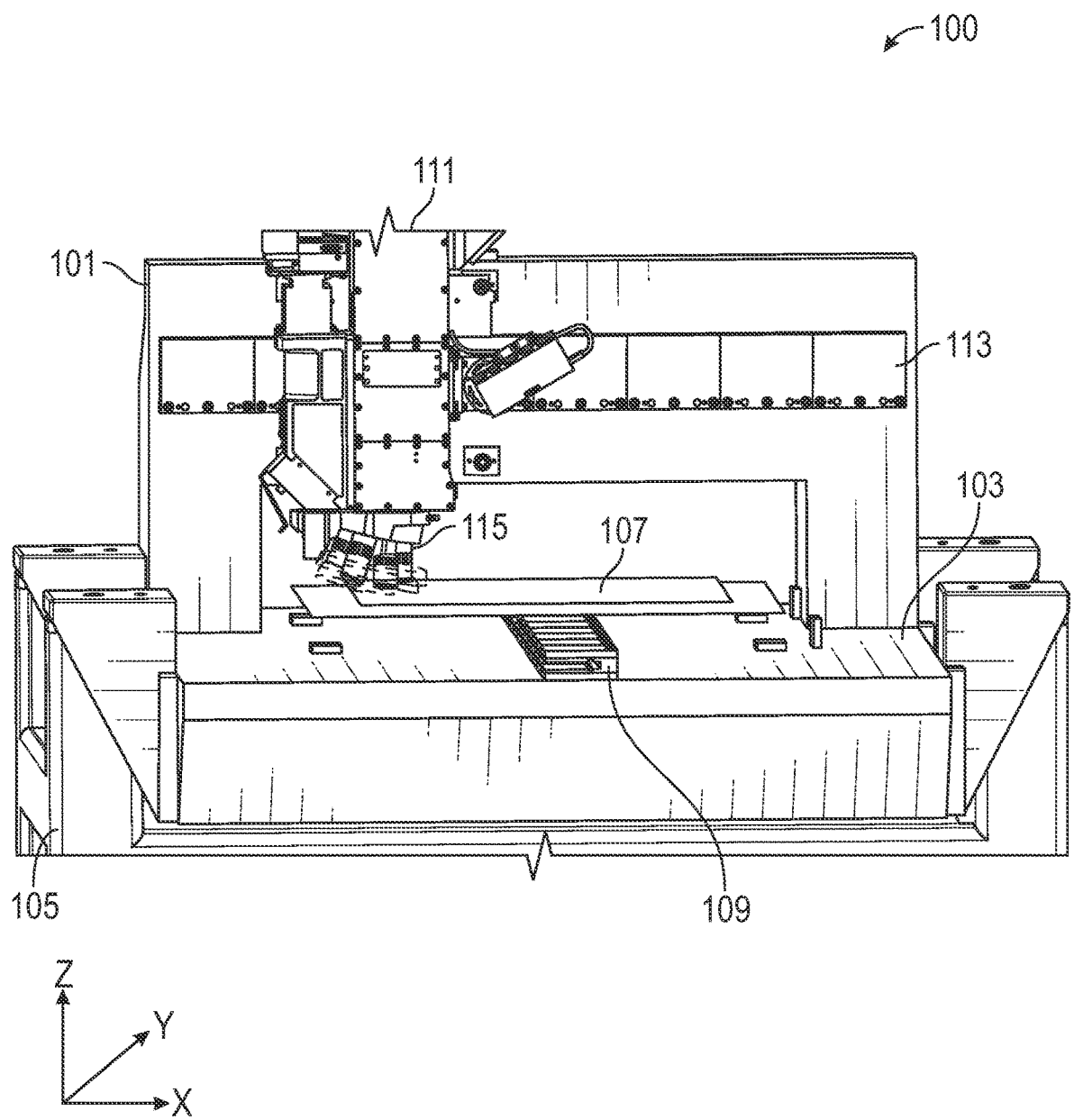
FIG. 1 shows an example of an apparatus arranged to move equipment and devices in various physical directions, the apparatus incorporates various embodiments of the disclosed subject matter.

Various embodiments of the disclosed subject matter are directed to an apparatus to provide motion in at least two linear-axes, where each of the linear-axes are substantially orthogonal to one another. The apparatus can include a load stage having a first actuator (e.g., a modified linear motor) coupled to the load stage to provide a linear motion to the load stage in a first direction. A wide-magnet pack is coupled to or included as a portion of the first actuator. The wide-magnet pack has a width sufficient to allow movement of the load stage in a second direction, which is substantially orthogonal to the first direction. A second actuator is also coupled to the load stage to provide the linear motion in the second direction, substantially within the constraints of the wide-magnet pack. As described in more detail herein, the second actuator is arranged to provide at least one of a linear motion and a rotary motion to the load stage in the second direction by moving the load stage in the second direction using, for example, one or more linear actuators or one or more voice-coil motors.

Various embodiments of the disclosed subject-matter include a bell-crank assembly disclosed herein coordinates the orthogonality and alignment of the mechanisms that provide two-axis motions. Consequently, various examples herein describe an apparatus to provide motion to a load stage that is configured to hold, for example, optical components, as is used for various types of equipment such as overlay, characterization, and/or inspection equipment, as the load stage passes over a substrate (e.g., a semiconductor substrate, a flat-panel display, a panel, a wafer, etc.). In various embodiments, the disclosed subject-matter is configured to move the load stage in a z-direction, with reference to the substrate, with substantially no tilt or other theta-rotation from a chosen z-height, while allowing other linear actuators to move the load stage in an x-direction and a y-direction.

The disclosed subject matter in various embodiments thus provides precision motion in at least two axes. A rotational motion may be imparted to the load stage as well by using another linear actuator mounted close to, off-center from, or on one edge of the load stage, thereby imparting a tilting or twisting motion (providing a theta-rotation).

Current two-axis linear-motion systems typically use independent motion and bearing systems to provide positioning in two or more directions. These linear-motion systems often include a linear-motion x-axis table and a separate linear-motion y-axis table, mounted to the x-axis table, to provide x-y positioning capabilities. Typically, each of the current linear-motion systems use a separate linear electric-motor in each of orthogonal directions to produce a linear force along the length of the linear motor. Additionally, a theta-rotation stage is frequently mounted to the combination x-axis and y-axis tables to provide movement of a load (e.g., a substrate, components of a metrology tool, an optical system, etc.) in an x-direction, a y-direction, and a theta-rotation direction. Each of these separate motion stages can add significant weight and physical size to current linear-motion systems.

In various embodiments, encoding of a direction of the linear motion (e.g., a scan motion) may use a laser interferometer to determine a distance moved by the load stage. Multiple laser interferometers may be used to encode linear motion in two or more directions, plus a theta rotation. However, other non-contact and contact techniques can be used for determination of an encoding position as well. For example, a non-contact sensor can detect or measure a physical property, such as distance of a target, without making direct contact with the target. Examples of non-contact sensors include fiber-optic sensors (using an optical fiber with a set of photodetectors located at each end of the fiber and a light source attached to the target) and capacitive-probe sensors (which rely on detecting a change in capacitance value to establish the position of the target being measured). A contact sensor includes, for example, potentiometric-position sensors (using a resistive track and wiper to measure resistance changes due to movement of the target) and inductive-position sensors (using a contact probe placed in coils in which a magnetic field is changed depending on a position of the probe, which is connected to the target).

The orientation of the load is controlled using a set of bearings, which can be adjusted using one or more actuators. The adjustment of the one or more actuators can change the orientation of the load laterally of rotationally as described in detail, below. As noted above, the position of these actuators can be monitored using various types of position encoding systems and encoding techniques.

Overall, the design of the disclosed subject matter creates a flat motion of the load, and eliminates the need for stacked stages (e.g., an x-axis stage mounted onto a y-axis stage (or z-axis stage) for two-dimensional motion, or a theta rotational-stage mounted to a one-dimensional or two-dimensional linear-axis stage). Additionally, with the two-axis motion design as disclosed herein, a moving mass of the combined axes is reduced, thereby improving dynamic performance and throughput. Employing a single air-bearing system to define the plane of motion in scan and theta can also improve a focus position of the load in, for example, metrology applications, by increasing stability and predictability while improving autofocus operations as well.

For example, with reference now to FIG. 1, an example of a substrate-inspection or metrology system 100, which incorporates various embodiments of the disclosed subject matter, is shown. FIG. 1 is shown to include a transfer bridge 101, a substrate-stage platform 103, system legs 105, a substrate stage 107, and a y-direction substrate-stage transport mechanism 109. FIG. 1 is also shown to include an example of a substrate-inspection or metrology load, such as an optical assembly 111, having an exemplary objective-lens turret 115. The optical assembly 111 is mounted to an exemplary version of a modified linear-motor 113. However, the optical assembly 111 is merely provided as an example of a device or piece of equipment that may benefit from the disclosed subject matter. As noted above, the disclosed subject matter is related generally to the field of movement of equipment and devices in various physical directions, such as three-dimensional printing and other applications, as well as lithography, substrate-inspection, and metrology tools used in the semiconductor and allied industries (e.g., flat-panel display, battery, and solar-cell production facilities).

The transfer bridge 101 is arranged such that the optical assembly 111 may be traversed over the substrate stage 107 in a ±x-direction by the modified linear-motor 113. The modified linear-motor 113 further allows the optical assembly 111 to move in a ±z-direction, as described in more detail below. However, as described herein, the movement in the ±z-direction does not require a separate second motor (e.g., a linear motor) mounted orthogonally to the first motor (e.g., another linear motor moving in the ±x-direction) as is found under the prior art. Upon reading and understanding the disclosed subject matter, a person of ordinary skill in the art will recognize that the modified linear-motor 113 may be oriented in various positions. Therefore, the modified linear-motor 113 may be arranged to move any load in, for example, a ±x-direction and a ±y-direction. Alternatively, the modified linear-motor 113 can be arranged to provide movement in a ±y-direction and a ±z-direction. As described in more detail below with reference to FIGS. 4A and 4B, load stage actuators can be used to impart an optional theta-rotation to the optical assembly 111 or other load stage.

The substrate stage 107 allows a substrate mounted thereto to move in a ±y-direction, under the transfer bridge 101. The y-direction substrate-stage transport mechanism 109 can move the substrate stage 107 in a ±y-direction substantially orthogonal to a direction in which the transfer bridge 101 is arranged. The y-direction substrate-stage transport mechanism 109 is mounted to the substrate-stage platform 103. In various embodiments, the substrate-stage platform 103 may comprise a granite block resting atop or supported by the system legs 105. In other embodiments, the substrate-stage transport mechanism 109 can move the substrate stage 107 in a direction non-orthogonal to which the transfer bridge 101 is arranged.

The optical assembly 111 is mechanically coupled to a load stage (not shown but described below starting with FIG. 2A) that is mechanically coupled to the modified linear-motor 113. Although the optical assembly 111 is shown with a substrate-inspection device (e.g., a substrate scanner) or a metrology device (e.g., an optical profilometer), the configuration is provided merely as an example to describe various ways in which the modified linear-motor 113 may be used.

As described in more detail below, the modified linear-motor 113 allows various types of devices to be mounted thereon. As shown in the exemplary embodiment of FIG. 1, the modified linear-motor 113 is configured to move the optical assembly 111 in both an x-direction as well as a z-direction.

As partially noted above, current two-axis linear-motion systems typically use independent motion and bearing systems to provide positioning in two or more directions. These linear-motion systems often include a linear-motion x-axis table and a separate linear-motion y-axis table, mounted to the x-axis table, to provide x-y positioning capabilities. Other types of two-axis linear-motion systems, such as a dual-axis linear stepper motor (e.g., a Sawyer motor), is a linear motor having a plate capable of moving in x- and y-directions, but requires magnets, or a grid pattern laid out in a ferrous material, that are laid out in two directions on a platen. Having magnets laid out in two directions is not needed using the system described herein.

In contrast to the prior art systems, the disclosed subject matter has a first actuator (e.g., a modified linear-motor) coupled to the optical assembly 111 to provide a linear motion to a load stage) upon which the optical assembly 111 is mounted) in a first direction (e.g., in the ±x-direction). A wide-magnet pack is coupled to or included as a portion of the first actuator. The wide-magnet pack has a width sufficient to allow movement of the load stage in a second direction, which is substantially orthogonal to the first direction (e.g., in the ±x-direction). Consequently, the width of the magnet pack, being proximate to the coils of the actuator, to remain in an effective magnetic field, even though the coils are moved in the orthogonal direction. As described below, a second actuator is also coupled to the load stage to provide the linear motion in the second direction, substantially within the constraints of the useful magnetic field area of the wide-magnet pack. The term "useful" may be considered to be within turns of the coils, such that the same, or substantially the same magnetic field pattern is experienced by the coils regardless of a position within the wide-magnet pack.

Figure 2A:
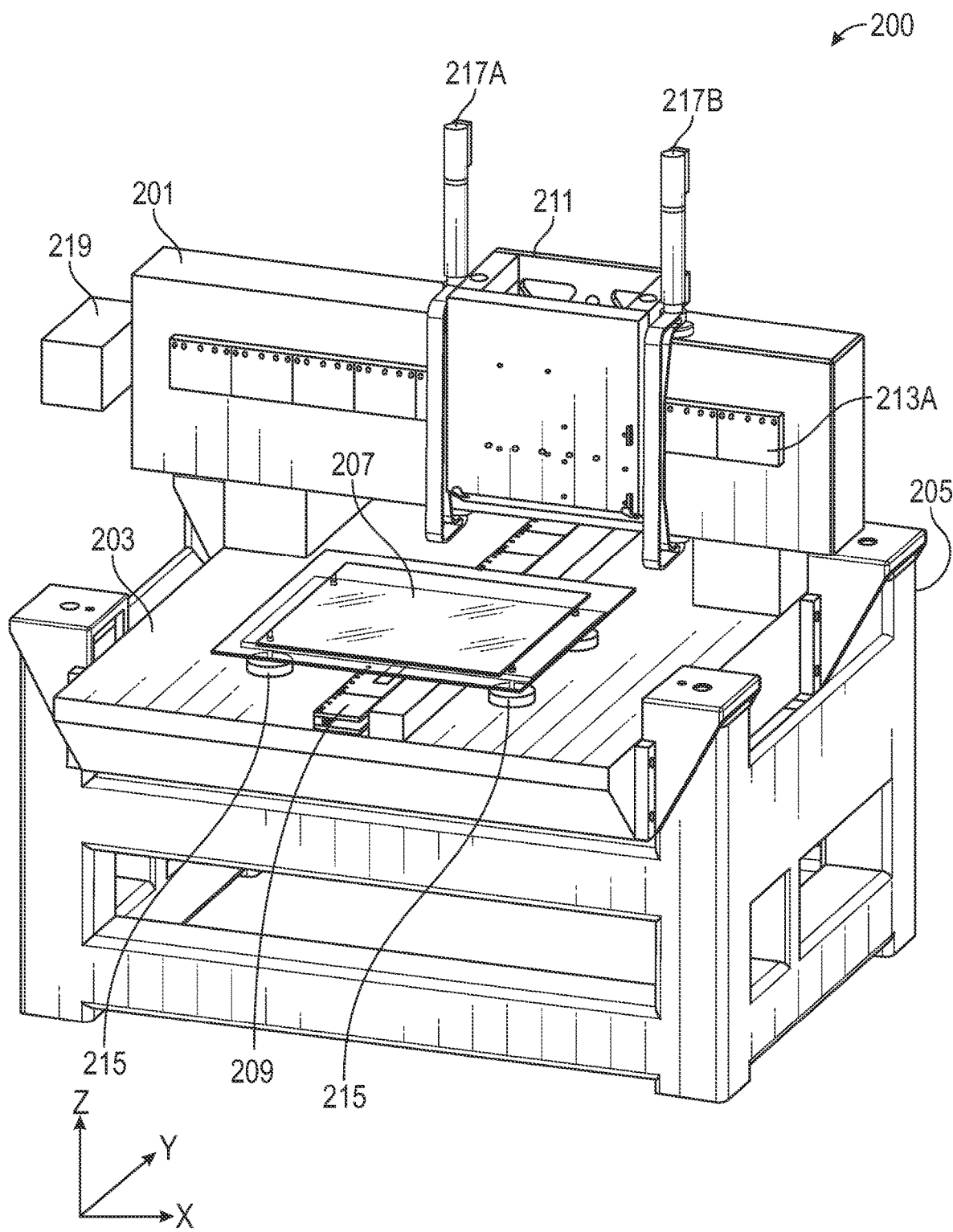
FIG. 2A shows a perspective view of another example of a multi-axis motion system incorporating air bearings and a modified version of a linear motor, which may be used with the substrate-inspection system of FIG. 1.

FIG. 2A shows a perspective view of another example of a multi-axis motion system 200 incorporating air bearings and a modified version of a linear motor, which may be used with the substrate-inspection system of FIG. 1. FIG. 2A is shown to include a transfer bridge 201, a substrate-stage platform 203, system legs 205, a substrate stage 207, a y-direction substrate-stage transport mechanism 209, and a modified linear-motor 213A. Each of the components including the transfer bridge 201, substrate-stage platform 203, the system legs 205, the substrate stage 207, the y-direction substrate-stage transport mechanism 209, and the modified linear-motor 213A may be the same as or similar to similar components identified in FIG. 1. FIG. 2A is also shown to include bearings 215 (e.g., air bearings or vacuum air-bearings) and a position encoder 219.

FIG. 2A is also shown to include a load stage 211, onto which various types of substrate-inspection and metrology devices may be mounted, such as the optical assembly 111 of FIG. 1. The load stage 211 is mechanically coupled to the modified linear-motor 213A. Also shown within FIG. 2A are z-direction load stage actuators 217A, 217B, which can be used to apply a force to the load stage 211 in a vertical direction (e.g., ±z-direction) as described in more detail, below. As described below with reference to FIGS. 4A and 4B, the load stage actuators 217A, 217B can also be used to impart an optional theta-rotation to the load stage 211.

The z-direction load stage actuators 217A, 217B are arranged to move the load stage 211 (and any devices mounted thereto) in, in this example, a ±z-direction. The load stage actuators 217A, 217B may be used to, for example, allow movement of an optical assembly mounted to the load stage to be moved vertically (e.g., in the z-direction) with regard to the substrate stage 207, to allow the optical assembly to focus over a range.

The load stage actuators 217A, 217B may comprise, for example, various types of linear-displacement transducers such as a linear variable-displacement transducer (LVDT), or various types of pneumatically- hydraulically- magnetically- and electrically-operable slides (e.g., spring loaded or double acting), voice-coil actuators, vice-coil motors, etc. Upon actuation, the load stage actuators 217A, 217B move the load stage 211 generally within a ±z-direction. Since the wide-magnet pack is coupled to or included as a portion of the first actuator, there is no need for a second linear motor to enable movement of the modified linear-motor 213A in the z-direction. The load stage 211 is coupled to a plate upon which a coil pack within the actuator are mounted (described in detail with reference to FIG. 3, below) and moves within the track of the modified linear-motor 213A. The wide-magnet pack within the modified linear-motor 213A allows the coupled load stage 211 to move along the modified linear-motor 213A while still allowing a z-direction movement within the modified linear-motor 213A.

The substrate stage 207, upon which a substrate may be mounted or otherwise supported, is supported by the bearings 215, allowing a mechanical stabilization of the substrate stage 207. In various embodiments, the bearings 215 may comprise low-friction supports such as, for example, air bearings or vacuum air-bearings as noted above. Air bearings are fluid bearings that use a thin film of pressurized gas to provide a low-friction interface between surfaces. The load stage 211 is also supported by a number of pre-load bearings, not shown in FIG. 2A but discussed below with reference to FIGS. 2B and 3.

The position encoder 219 allows the multi-axis motion system 200 to determine a position of the load stage 211 (e.g., a lateral motion of the load stage 211 in an x-direction). In various embodiments, the position encoder 219 may comprise, for example, various types of position sensors such as, for example, a laser interferometer. Although not shown explicitly, such a position encoder may be used to determine a position of the load stage 211 in other directions as well (e.g., in a z-direction).

Figure 2B:
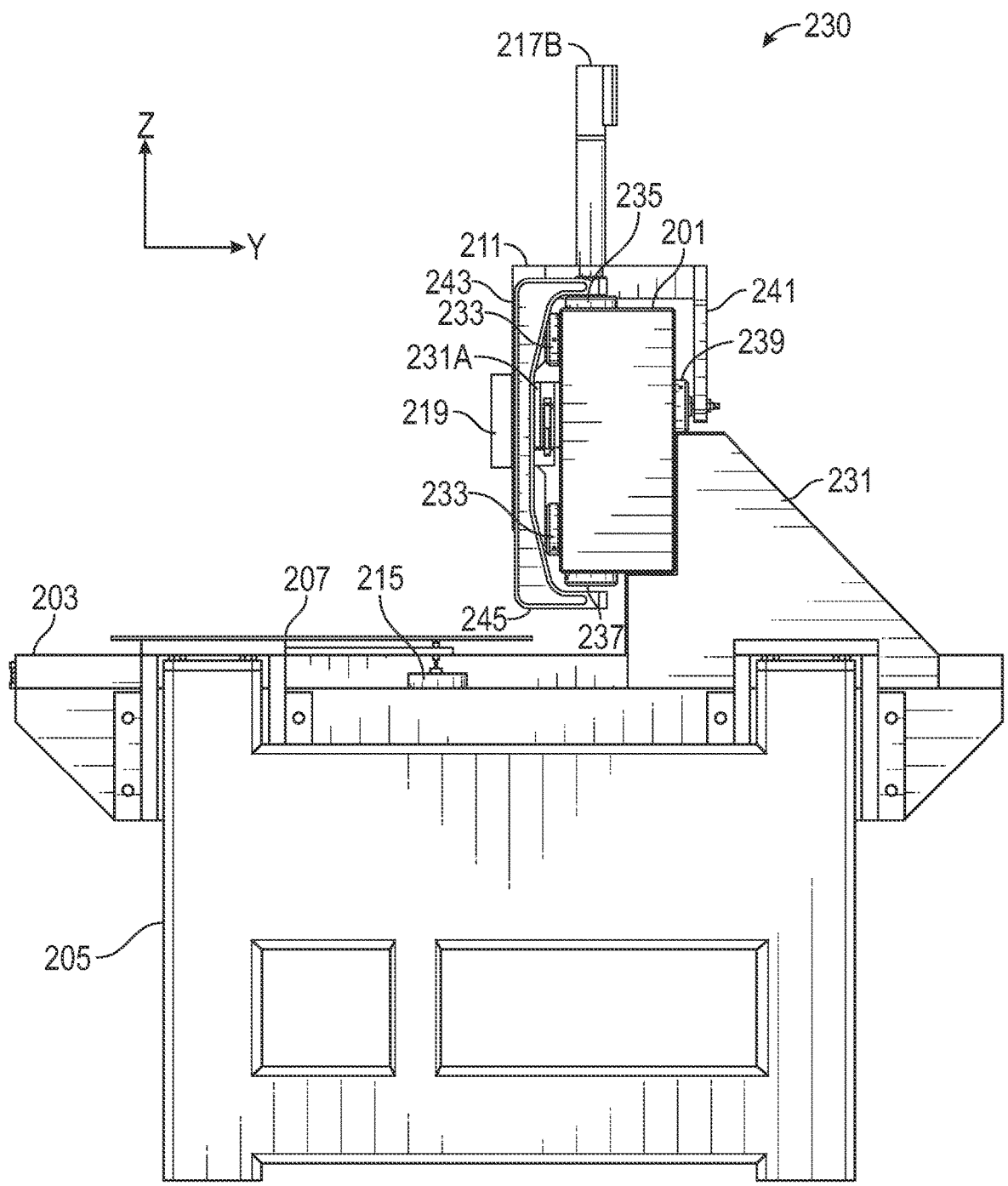
FIG. 2B shows a side-elevation view of the example of the multi-axis motion system of FIG. 2A.

FIG. 2B shows a side-elevation view 230 of the example of the multi-axis motion system 200 of FIG. 2A. In addition to the components described above with reference to FIG. 2A, FIG. 2B is also shown to include a support portion 231A, top-side pre-load bearings 235, front-side pre-load bearings 233, bottom-side pre-load bearings 237, and back-side pre-load bearings 239. Only one of each of the pre-load bearings is shown in FIG. 2A but are shown in more detail with regard to FIGS. 4A and 4B, described below.

The front-side pre-load bearings 233 are shown to be mounted to a front-frame portion 243 of the load stage 211 and the back-side pre-load bearings 239 are mounted to a back-frame portion 241 of the load stage 211. The bottom-side pre-load bearings 237 are shown to be mounted to a bottom-frame portion 245 of the load stage 211. In various embodiments, the bottom-frame portion 245 may not be used.

The support portion 231 provides additional structural support for the transfer bridge 201. Except for a possible pre-load condition, each of the pre-load bearings 233, 235, 237, 239 are supported by the transfer bridge 201 and may be the same as or similar to the bearings 215. For example, the front-side pre-load bearings 233 and the top-side pre-load bearings 235 maintain a fixed-distance relationship between the load stage 211 and the transfer bridge 201. As shown in more detain with reference to FIG. 3, each of the load stage actuators 217A, 217B is coupled on a bottom end to respective ones of the top-side pre-load bearings 235, so as to remain in contact with the uppermost portion of the transfer bridge 201 regardless of a vertical position (e.g., z-direction) of the load stage 211. Each of the load stage actuators 217A, 217B is coupled to the load stage 211 as the load stage actuators 217A, 217B push down on the top-side pre-load bearings 235.

The back-side pre-load bearings 239 also maintain a fixed-distance relationship between a back-side of the load stage 211 and the transfer bridge 201. Further, back-side pre-load bearing 239 are arranged as one or more catch bearings to limit disengagement of the load stage 211 from the modified linear-motor 213A. Therefore, a combination of the front-side pre-load bearings 233, the top-side pre-load bearings 235, and the back-side pre-load bearings 239 all serve mechanically to position and stabilize the load stage 211 with reference to the transfer bridge 201.

Further, in FIG. 2B the bottom-side pre-load bearings 237 are shown to be in contact with a bottommost portion of the transfer bridge 201. However, the load stage actuators 217A, 217B can be positioned to lower the load stage 211 to be in closer proximity to the substrate stage 207. In various embodiments, when the load stage 211 is lowered, the bottom-side pre-load bearings 237 no longer contact the transfer bridge 201. In other embodiments, the bottom-side pre-load bearings 237 can be, for example, spring-loaded and therefore maintain contact the transfer bridge 201 regardless of a z-position of the load stage 211.

Figure 3:
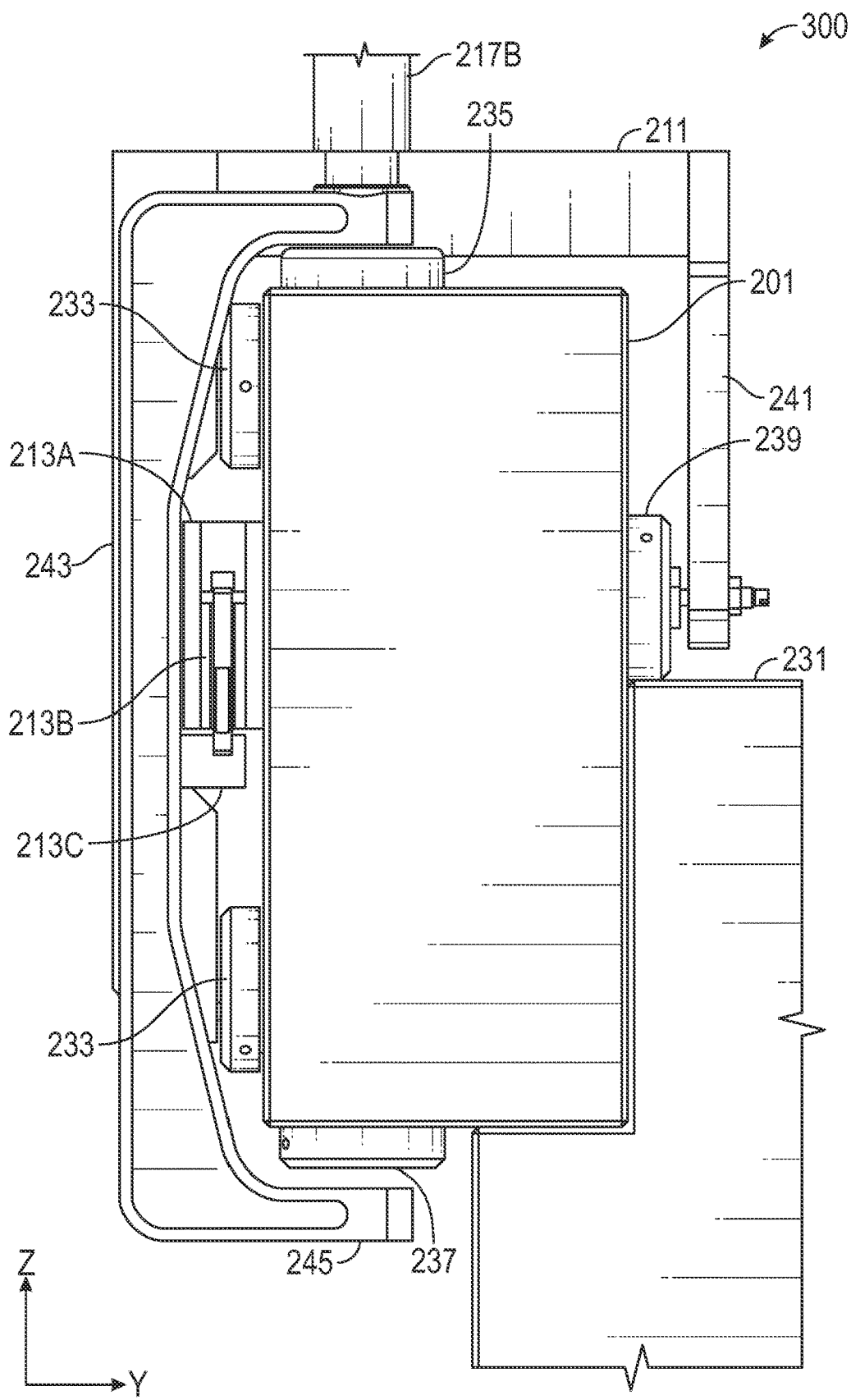
FIG. 3 shows a side-elevation view of a portion of the multi-axis motion system of FIGS. 2A and 2B upon which a load, such as an optical assembly of a substrate-inspection or metrology system, may be mounted.

FIG. 3 shows a side-elevation view 300 of a portion of the multi-axis motion system 200, 230 of FIGS. 2A and 2B upon which a load, such as an optical assembly of a substrate-inspection or metrology system described above, may be mounted. However, as noted above, the disclosed subject matter is related generally to the field of movement of equipment and devices in various physical directions, such as three-dimensional printing and other applications, as well as lithography, substrate-inspection, and metrology tools used in the semiconductor and allied industries (e.g., flat-panel display, battery, and solar-cell production facilities). In addition to the components described above with reference to FIGS. 2A and 2B, FIG. 3 is shown to include the load stage 211 mechanically coupled to a mounting-plate 213C, which in turn is mechanically coupled to a coil-bearing plate 213B within the modified linear-motor 213A. The coil-bearing plate 213B moves within a magnetic field generated within the modified linear-motor 213A, thereby activating a motion in the x-direction (see FIG. 2A). The coil-bearing plate 213B thereby behaves in a manner similar to a rotor in a rotary motor, while the magnetic field is generated by in a manner similar to a stator in the rotary motor. The difference between the modified linear-motor 213A and the rotary motor is that the modified linear-motor 213A moves in a linear direction rather that in a rotary direction. However, since the modified linear-motor 213A uses a wide-magnet pack (a magnet pack that is increased in width by an anticipated amount of movement in the z-direction), no second linear-stage, mounted substantially orthogonally to a first linear-stage, is needed.

Figure 4A:
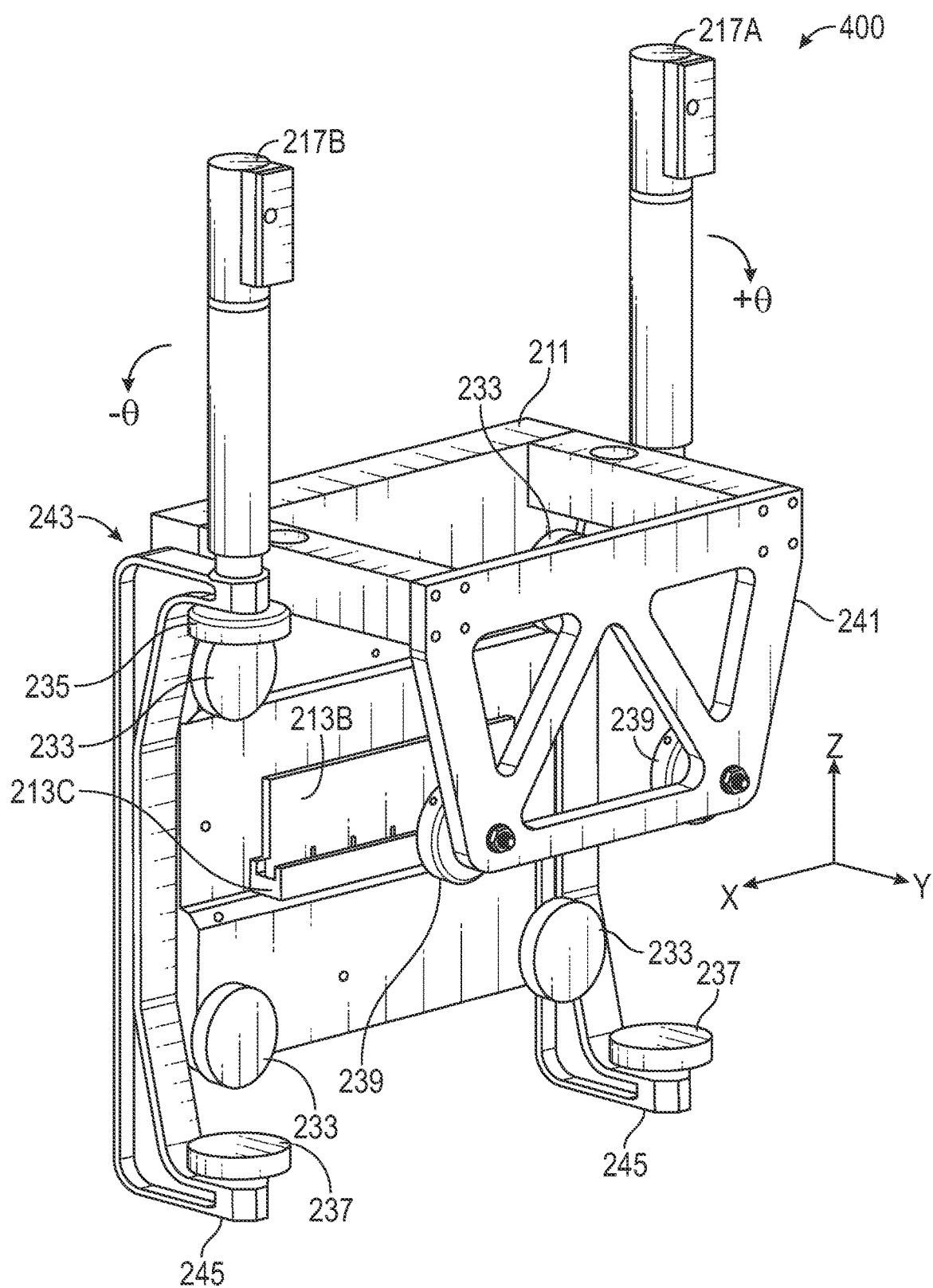
FIG. 4A shows a backside perspective-view of the multi-axis motion system of FIG. 3, in accordance with various embodiments.
Figure 4B:
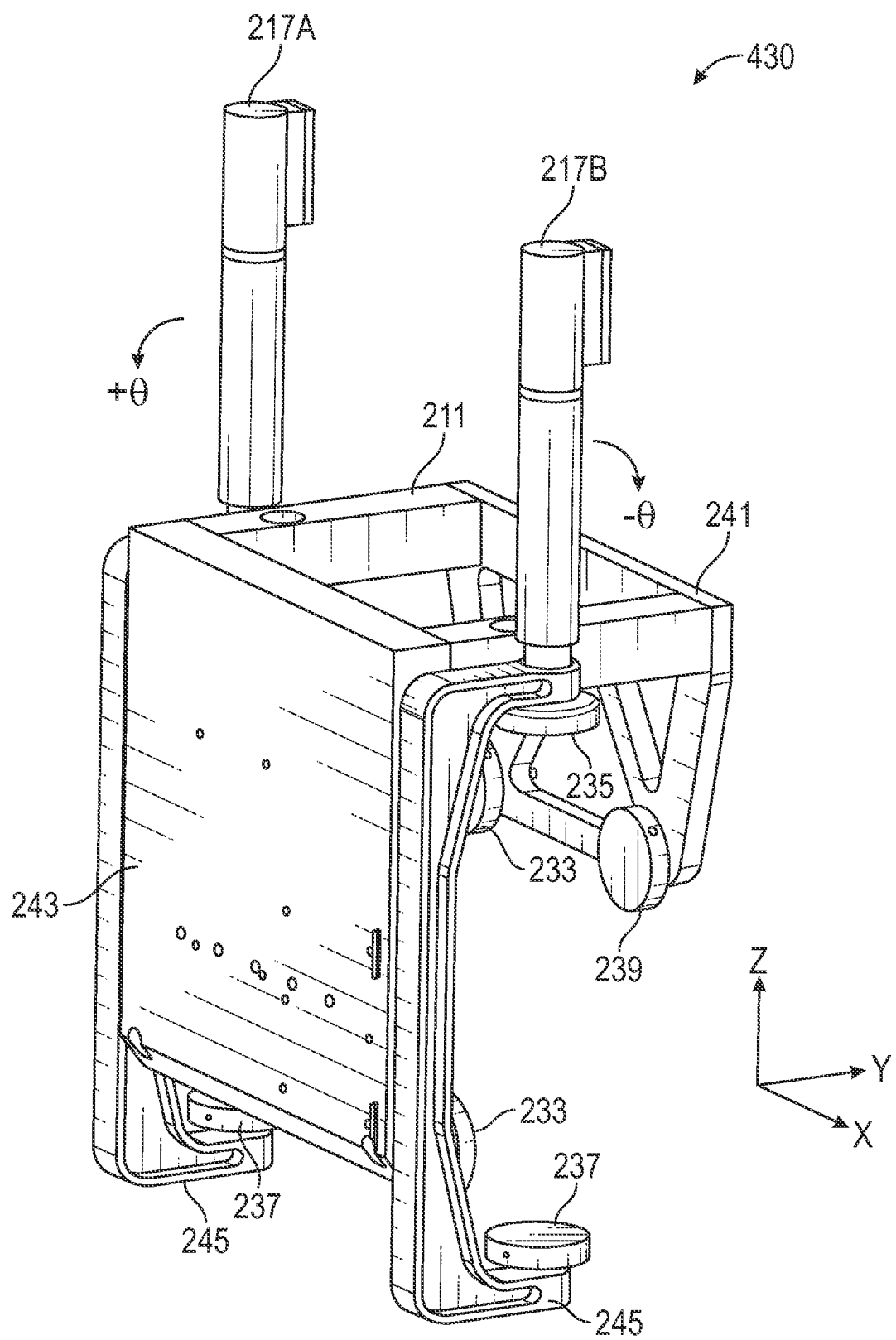
FIG. 4B shows a frontside perspective-view of the multi-axis motion system of FIG. 3, in accordance with various embodiments.

FIG. 4A shows a backside perspective-view 400 of the multi-axis motion system 300 of FIG. 3, in accordance with various embodiments. FIG. 4B shows a frontside perspective-view 430 of the multi-axis motion system 300 of FIG. 3, also in accordance with various embodiments. By applying a downward force (in the negative z-direction) to both of the load stage actuators 217A, 217B, the load stage 211 is raised away from the substrate stage 207 (see FIG. 2A). Consequently, the load stage 211 is raised in a positive z-direction. Conversely, by applying an upward force (in the positive z-direction) to both of the load stage actuators 217A, 217B, the load stage 211 is lowered toward from the substrate stage 207 (the load stage 211 is moved in a negative z-direction).

By applying a downward force (in the negative z-direction) to a single one of the actuators, for example, the load stage actuator 217A, the load stage 211 will be tilted in a clockwise direction (as viewed from the front of the load stage 211 as depicted in FIG. 2A or FIG. 4B), thereby providing a theta-rotational direction movement to the load stage. In a similar fashion, by applying force to the load stage actuator 217B, the load stage 211 will be tilted in a counter-clockwise direction, again as viewed from the front of the load stage 211. In addition to applying a downward force to either of the load stage actuators 217A, 217B separately, opposing forces (one actuator moved upward in a positive z-direction and the other actuator moved downward in a negative z-direction) an additional amount of theta-rotational tilt of the load stage 211 may be realized.

In various types of systems, a moving mass of an optical assembly (e.g., a focus stage) can significantly be reduced or eliminated by using aspects of the disclosed subject matter. Removing the second linear motion system as is used by the prior art, can reduce dynamic mass by approximately 45 kilograms (100 pounds-mass) or more. Further, using a single-bearing system as described herein to define a plane-of-motion of an optical system can improve optical alignment, speed, and mechanical stability.

In various embodiments, the disclosed subject-matter is directed to an apparatus to provide a z-direction motion to a load stage. In various embodiments, and as described in more detail below, the load stage, which can be configured to move across a bridge (e.g., a granite bridge) that is positioned over a substrate under investigation, is supported above the bridge by, for example, air bearings. The load stage can be driven up (+z-direction) and down (−z-direction) by one or more z-direction load-stage actuators, such as voice-coil motors (acting to apply force to the load stage in a z-direction). A motion actuator (e.g., a pneumatically-operated bellows operating in a linear direction in some embodiments) acting as a portion of a bell-crank assembly (described below with reference to FIG. 5C through FIG. 5E), is coupled to a shaft mounted to the motion actuator and between the one or more z-direction load-stage actuators, with the shaft coupled mechanically to the z-direction load-stage actuators at opposing ends of the shaft. However, as described in more detail below, only a single z-direction load stage actuator may be used. As shown in various ones of the drawings, two z-direction load-stage actuators are shown merely to better explain one embodiment of the disclosed subject-matter. The shaft is configured to apply a torque from the motion actuator to, for example, the one or more z-direction load-stage actuators, as described below.

The motion actuator applies a force to the shaft through a bell-crank assembly, thereby applying torque to the shaft. The shaft in turn applies torque to the one or more z-direction load-stage actuators. The torque applied to the one or more z-direction load-stage actuators help maintain or provide a substantially uniform force (e.g., synchronized for vertical movement) to the load stage and substantially prevent any theta-rotation (relative to each side of the load stage, relative to an axis over which the load stage is to be moved in an x-direction as defined with reference to FIG. 1)

of the load stage. The motion actuator therefore applies a force on the shaft in a direction that is substantially transverse to a direction of a force applied to the load stage by the one or more z-direction load-stage actuators.

The disclosed subject-matter therefore limits an amount of rotation in the system so tilt of the load stage is restricted. The bell-crank assembly disclosed acts as a crank arm to adjust a relative height of the load stage above the substrate so forces from each of the z-direction load-stage actuators act in unison with one another on the load stage. The motion actuator carries most of the weight of the load stage with the z-direction load-stage actuators providing a desired height (e.g., for focusing of optical components mounted to the load stage) of the load stage above the substrate under inspection.

In embodiments, an optical encoder may be coupled to at least one end of the shaft and can be used to monitor a height in the z-direction of the load stage (based on, for example, the sin (theta) of the rotation of the shaft). As noted above, the motion actuator supplying force on the shaft acts substantially transverse to a direction of the z-direction load-stage actuators acting on the load stage.

The disclosed subject-matter can be used with any type of high-speed system in which speed, stability, and straight motion are considerations. The system incorporates, for example, linear motors that are coupled to each other mechanically through a bell-crank assembly to ensure that each motor provides a "lift" in the z-direction with high accuracy with full coordination between the z-direction load-stage actuators.

Figure 5A:
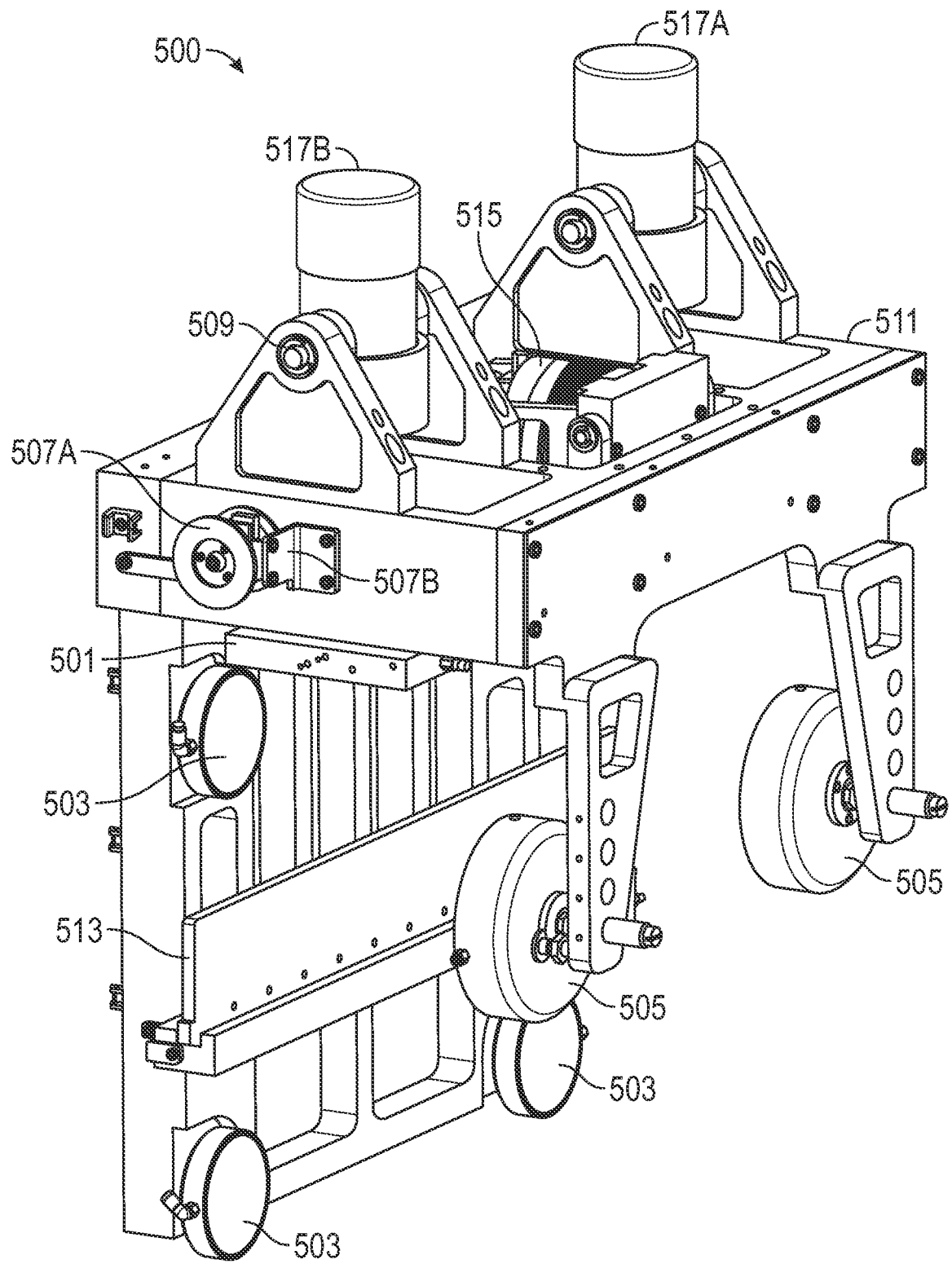
FIG. 5A shows an example of a rear-perspective view of an exemplary load stage that incorporates various embodiments of the disclosed subject-matter.

FIG. 5A shows a rear-perspective view 500 of a load stage 511 that incorporates various embodiments of the disclosed subject-matter. FIG. 5A is shown to include a first z-direction load stage actuator 517A, a second z-direction load stage actuator 517B, a motion actuator 515 located proximate to at least one of the z-direction load-stage actuators 517A, 517B, and pivot points 509 around which each of the z-direction load-stage actuators 517A, 517B may be provided with a limited rotational movement that is substantially around an imaginary line drawn from an approximate center-location of the first z-direction load-stage actuators 517A to the second z-direction load-stage actuators 517B. The z-direction load-stage actuators 517A, 517B allow positioning the load stage 511 at a height away from the substrate stage 207 (see FIGS. 2A and 2B) to allow for, for example, focusing operations that may be mounted onto the load stage 511 or other operations. Although only two z-direction load-stage actuators are shown, additional pairs of the z-direction load-stage actuators may be used. Further, a single z-direction load stage actuator may be used. As shown in various ones of the drawings, two z-direction load-stage actuators 517A, 517B are shown merely to better explain the disclosed subject-matter and one embodiment of the disclosed subject-matter.

As is described in more detail below, the motion actuator 515 is applying a force in a direction that is substantially transverse to a force applied in a ±z-direction by the z-direction load-stage actuators 517A, 517B. A shaft (not shown in FIG. 5A but is shown and described with reference to FIG. 5C through FIG. 5E, below).

FIG. 5A is also shown to include a z-direction bearing 501 (e.g., an air bearing, only one of which is shown in FIG. 5A), an encoder 507A and an encoder reader 507B, front-side bearings 503, back-side bearings 505, and a modified linear-motor 513 (e.g., an x-direction motor). The motion actuator 515 further provides support in the approximate center of the load stage 511 and also pre-loads the z-direction bearings 501. Each of the components including the load stage 511, the z-direction load-stage actuators 517A, 517B, the motion actuator 515, and the modified linear-motor 513 may be the same as or similar to similar components described in FIG. 1, FIG. 2A, and FIG. 2B.

The back-side bearings 505 can be used to maintain a fixed-distance relationship between a back-side of the load stage 511 and the transfer bridge 201 (see FIGS. 2A and 2B). Further, the back-side bearings 505 are arranged as one or more catch bearings to limit disengagement of the load stage 511 from the modified linear-motor 513. Therefore, a combination of the front-side bearings 503, the z-direction bearings 501, and the back-side bearings 505 all serve mechanically to position and stabilize the load stage 511 with reference to the transfer bridge 201 (see FIGS. 2A and 2B), while still allowing movement in each of the x-, y-, and z-directions.

The motion actuator 515 comprises one of various types of linear or rotary actuators or other force-application mechanisms such as, for example, a pneumatically-operated or a hydraulically-operated actuator capable of applying a force against a portion of a bell-crank assembly (not shown in FIG. 5A but shown and described with reference to FIG. 5C through FIG. 5E, below). The z-direction load-stage actuators 517A, 517B can also comprise, for example, pneumatically-operated or hydraulically-operated actuators capable of applying a force against respective ones of the z-direction bearings 501. In a specific exemplary embodiment, the z-direction load-stage actuators 517A, 517B comprise voice-coil motors. Each of the voice-coil motors, in this example, can receive an electrical signal from an electrical-signal line (not shown) substantially simultaneously such that the voice-coil motors operate in unison to raise or lower the load stage 511. Where the z-direction load-stage actuators 517A, 517B are, for example, pneumatically operated or hydraulically operated, a signal may be sent to, for example, an air reservoir or an oil-filled reservoir to provide the appropriate fluid to the z-direction load-stage actuators 517A, 517B to operate the actuators substantially in unison to raise or lower the load stage 511. Once the z-direction load-stage actuators 517A, 517B are actuated, the z-direction bearings 501 coupled to each of the z-direction load-stage actuators 517A, 517B, in turn, apply a force against a portion of, for example, the transfer bridge 201 (see FIGS. 2A and 2B) to raise or lower the load stage 511 in a z-direction (see, for example, FIG. 5C).

To provide an example, when metrology and/or substrate inspection pieces of equipment (e.g., such as the optical assembly 111 of FIG. 1) are mounted to the load stage, the load stage 511 may use a force of approximately 1000 Newtons (approximately 225 pound-force) to provide a +z-direction movement. In an embodiment, when the z-direction load-stage actuators 517A, 517B comprise a voice-coil motor, a typical force provided by each voice-coil motor may be about 250 Newtons (approximately 56 pound-force) per motor. An interaction between these forces supplied by the and the z-direction load-stage actuators 517A, 517B and the motion actuator 515 used to stabilize and provide additional and even forces between the z-direction load-stage actuators 517A, 517B is described in more detail with reference to FIG. 5C and FIG. 5D, below. Additionally, various types of force-applying mechanisms may be used in addition to the disclosed subject-matter described herein. Such force-applying mechanisms include, for example, springs (e.g., extension, compression, torsion), pneumatic cylinders, counterweights, etc.

In various embodiments, each of the z-direction bearings 501, the front-side bearings 503, and the back-side bearings 505 may comprise, for example, air bearings or vacuum bearings. Air bearings are fluid bearings that use a thin film of pressurized gas to provide a low-friction interface between surfaces. The load stage 511 may also be supported by a number of pre-load bearings, which are not shown but are known in the relevant art.

The front-side bearings 503 provide a low-friction interface between the front-side of the load stage 511 (since the front-side bearings 503 are mounted to a rear portion of the front portion of the load stage 511) and, for example, a front-side portion of the transfer bridge 201 (see FIGS. 2A and 2B) regardless of a vertical position (e.g., z-direction) of the load stage 511. In a similar manner, the back-side bearings 505 provide a low-friction interface between the back-side of the load stage (since the back-side bearings 505 are mounted to a front portion of the rear portion of the load stage 511) and, for example, a back-side portion of the transfer bridge 201 (see FIGS. 2A and 2B) regardless of a vertical position (e.g., z-direction) of the load stage 511.

In various embodiments, encoding of a z-height position is based on a rotation of a shaft (as shown and described below with reference to FIG. 5C through FIG. 5E) that is mechanically coupled between the motion actuator 515 and the z-direction load-stage actuators 517A, 517B. The encoder 507A and the encoder reader 507B may be based on, for example, a mechanically-based or optically-based encoder determining a rotation of the shaft. A z-height difference may be calculated based on, for example, a sine of an angular rotation of the shaft. The difference in height moved by the load stage 511 may therefore be determined based on a circular-to-linear conversion by applying, for example, trigonometric functions. However, other non-contact and contact techniques can be used for determination of an overall z-height of the load stage 511 as well.

Figure 5B:
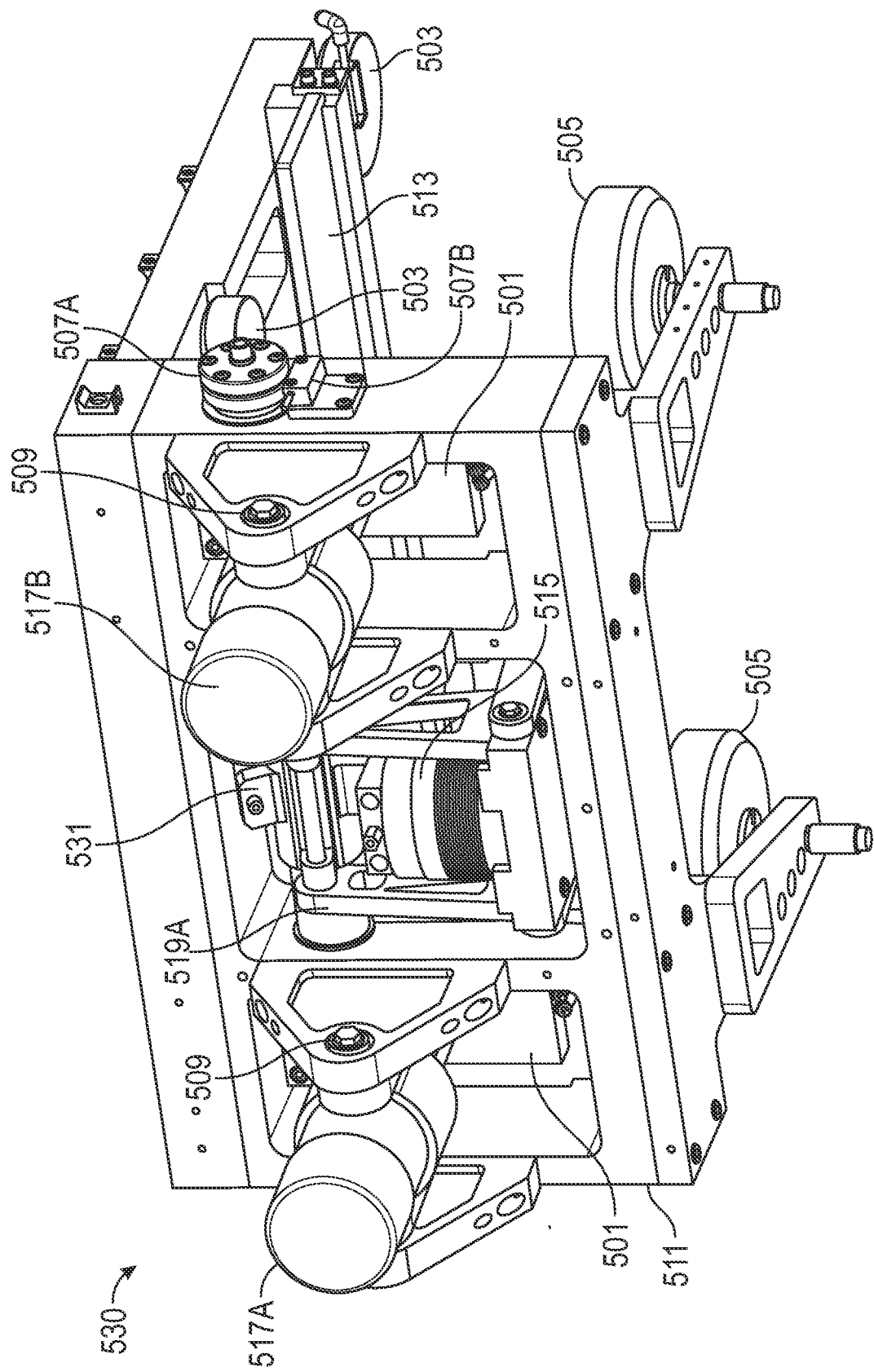
FIG. 5B shows a top-perspective view of the load stage of FIG. 5A, which incorporates various embodiments of the disclosed subject-matter.

FIG. 5B shows a top-perspective view 530 of the load stage 511 of FIG. 5A, which incorporates various embodiments of the disclosed subject-matter. FIG. 5B is shown to include force-coupling linkages 519A (located on either side of the motion actuator 515, shown in FIG. 5B as an exemplary pneumatically-operated bellows), and a shaft-coupling mechanism 531 to couple forces generated by the motion actuator 515, through the force-coupling linkages 519A, to the shaft (each of which is described in more detail with reference to FIG. 5C and FIG. 5D, below). Additionally, FIG. 5B shows the z-direction bearings 501 mechanically coupled beneath each of the z-direction load-stage actuators 517A, 517B.

Figure 5C:
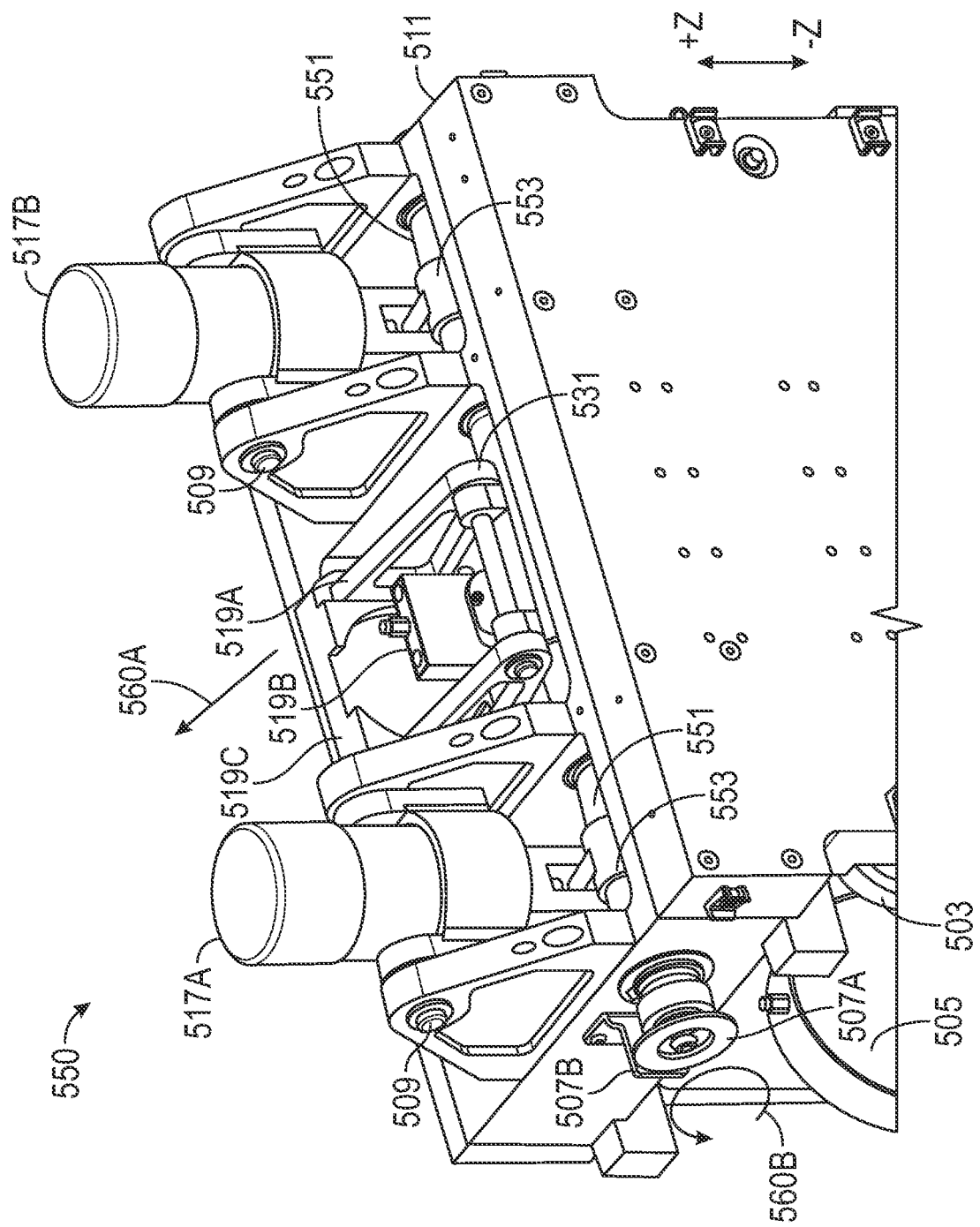
FIG. 5C shows a front-perspective view of a portion of the load stage of FIG. 5A, which incorporates various embodiments of the disclosed subject-matter.

FIG. 5C shows a front-perspective view 550 of a portion of the load stage 511 of FIG. 5A, which incorporates various embodiments of the disclosed subject-matter. FIG. 5C is shown to include a shaft 551, an actuator coupler 553 coupled from each of the z-direction load-stage actuators 517A, 517B to the shaft 551, a fixed linear-actuator block 519B, and a moveable linear-actuator block 519C. Together, the force-coupling linkages 519A, the fixed linear-actuator block 519B, and the moveable linear-actuator block 519C form a bell-crank assembly. Once activated, the bell-crank assembly provides stabilization to the load stage 511 for a high-precision system. The motion actuator 515 is not shown in FIG. 5C so as not to obscure the components of the bell-crank assembly.

In operation, when the motion actuator 515 applies a force from the fixed linear-actuator block 519B toward the moveable linear-actuator block 519C in a linear direction 560A, the force from the motion actuator 515 is transmitted through the force-coupling linkages 519A, through the shaft-coupling mechanism 531 to rotate the shaft 551 producing a rotary direction 560B. The shaft 551 applies a torque to the actuator couplers 553 to respective ones of the z-direction load-stage actuators 517A, 517B, which applies additional force to lift the load stage 511 in a +z-direction. The z-direction load-stage actuators 517A, 517B are each allowed to rotate slightly around respective ones of the pivot points 509 to reduce or eliminate any binding that might otherwise occur if the z-direction load-stage actuators 517A, 517B were fixed and not allowed to rotate slightly.

The torque applied by the shaft 551 also keeps substantially the same "lift" applied to each side of the load stage 511 by applying substantially the same force to each of the z-direction load-stage actuators 517A, 517B. Consequently, in this example, the transmitted force applied by the motion actuator 515 supplements the lift force supplied through the z-direction load-stage actuators 517A, 517B, while preventing a twisting motion of the load stage 511, which might otherwise occur if each of the z-direction load-stage actuators 517A, 517B do not apply the same force substantially equally.

If the load stage 511 is lowered in a −z-direction, the forces described above operate in substantially the same manner with forces being applied in opposite directions from those shown by the linear direction 560A and the rotary direction 560B arrows. Therefore, the motion actuator 515 provides an additional force to each of z-direction load-stage actuators 517A, 517B to act in unison after an external raise or lower signal is supplied, as described above. Consequently, in addition to providing an additional lift and side-to-side stabilization of forces to the load stage 511, the motion actuator 515 can be considered as a type of ballast system.

An initial calibration of the system to adjust the amount of torque applied by the motion actuator 515 to each of the z-direction load-stage actuators 517A, 517B may also be applied. Adjusting a relative position of the shaft-coupling mechanism 531 and each of the actuator couplers 553 with reference to a position on the shaft 551 can supply the calibration to adjust the amount of torque applied from the shaft 551 to each of the z-direction load-stage actuators 517A, 517B in a substantially equal manner.

In a specific exemplary embodiment, the shaft 551 may comprise a solid stainless-steel rod with a diameter of about 35 mm and a length sufficient to span from one of the z-direction load-stage actuators 517A, 517B to the other. In embodiments, the shaft 551 may comprise other material types that are pre-determined to supply sufficient torque as needed for a pre-determined mass on the load stage 511. In embodiments, a larger diameter of the shaft 551 may be selected such that the same torque may be applied but through a hollow (e.g., tubular) version of the shaft 551.

Figure 5D:
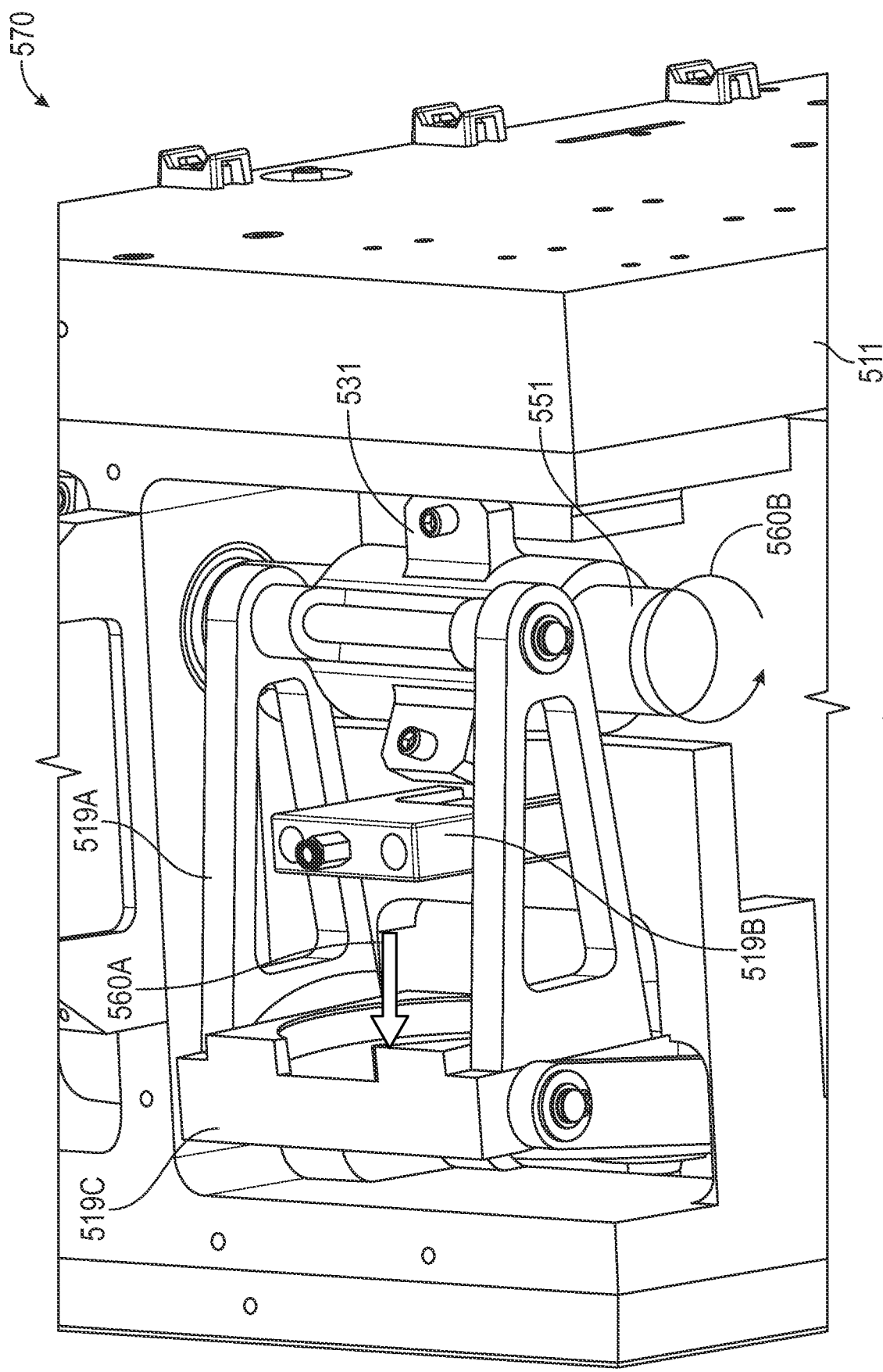
FIG. 5D shows a top-perspective view of a portion of the load stage of FIG. 5A that houses a motion actuator in accordance with various embodiments of the disclosed subject-matter.
Figure 5E:
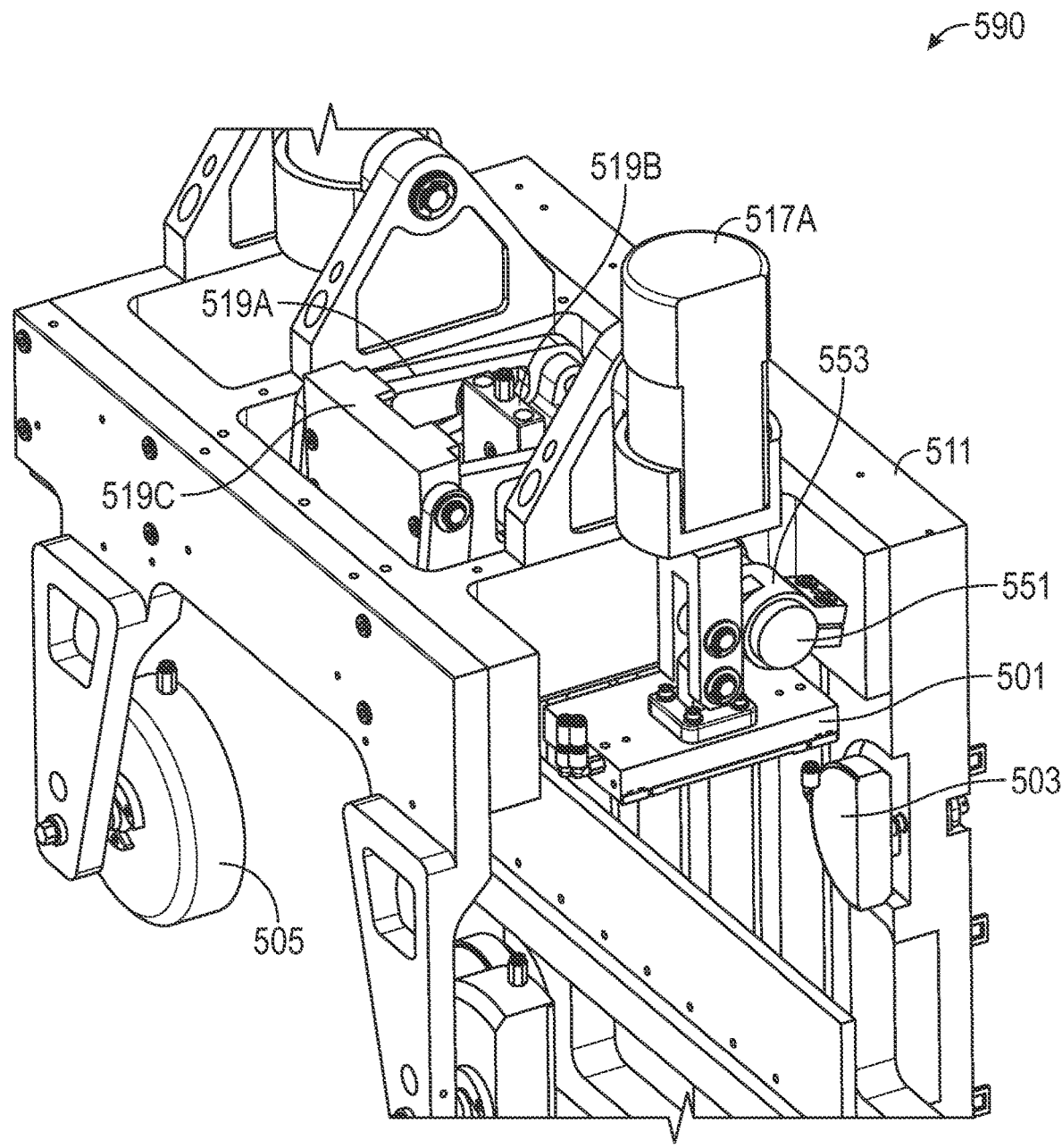
FIG. 5E shows a top-perspective view of a portion of the load stage of FIG. 5A, indicating the motion actuator and z-direction load-stage actuators that are transversely-mounted with reference to the z-direction load-stage actuators linear-actuator of FIG. 5D.

With continuing reference to FIG. 5B and FIG. 5C, FIG. 5D shows a top-perspective view 570 of a portion of the load stage 511 of FIG. 5A that houses the motion actuator 515 (albeit not shown in FIG. 5D so as not to obscure the components of the bell-crank assembly) in accordance with various embodiments of the disclosed subject-matter. As noted above, the bell-crank assembly comprises the force-coupling linkages 519A, the fixed linear-actuator block 519B, and the moveable linear-actuator block 519C. FIG. 5D provides an additional view of the force applied in the linear direction 560A and the resulting torque in the rotary direction 560B.

With continuing reference to FIG. 5B through FIG. 5D, FIG. 5E shows a top-perspective view 590 of a portion of the load stage 511 of FIG. 5A, indicating the motion actuator 515 (albeit not shown in FIG. 5D so as not to obscure the components of the bell-crank assembly) and the z-direction load-stage actuators 517A, 517B that are transversely-mounted with reference to the motion actuator 515 of FIG. 5B. As indicated by the force in the linear direction 560A (see FIG. 5C and FIG. 5D) applied by the motion actuator 515, the z-direction load-stage actuators 517A, 517B apply a force in the ±z-direction (see FIG. 5C). Consequently, the force in the linear direction 560A is substantially transverse to the forces applied by the z-direction load-stage actuators 517A, 517B.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating.

In an example, hardware of circuitry to control, for example, the z-direction load-stage actuators 517A, 517B may be designed immutably to carry out a specific operation (e.g., hardwired). In an example, the hardware comprising the circuitry may include variably connected physical components (e.g., execution units, transistors, simple circuits, etc.) including a computer-readable medium physically modified (e.g., magnetically, electrically, such as via a change in physical state or transformation of another physical characteristic, etc.) to encode instructions of the specific operation.

In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Figure 6:
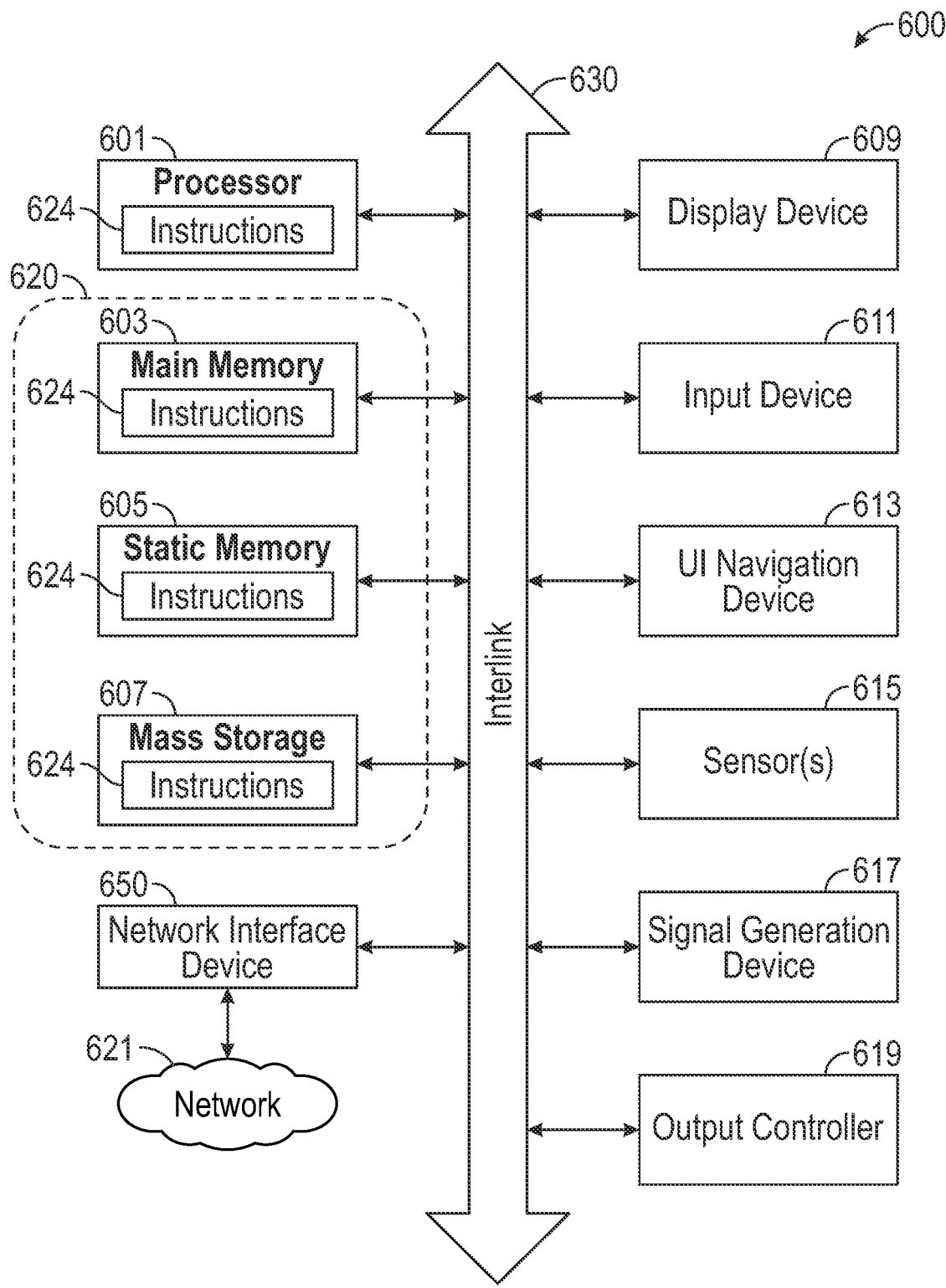
FIG. 6 shows a block diagram of an example comprising a machine upon which any one or more of the techniques (e.g., methodologies) discussed herein may be performed.

The methods and techniques shown and described herein can be performed using a portion or an entirety of a machine 600 as discussed below in relation to FIG. 6. FIG. 6 shows an exemplary block diagram comprising a machine 600 upon which any one or more of the techniques (e.g., methodologies) discussed herein may be performed. In various examples, the machine 600 may operate as a standalone device or may be connected (e.g., networked) to other machines.

In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer-readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 600 (e.g., computer system) may include a hardware-based processor 601 (e.g., a central processing unit (CPU), a graphics processing unit (GPU), a hardware processor core, or any combination thereof), a main memory 603 and a static memory 605, some or all of which may communicate with each other via an interlink 630 (e.g., a bus). The machine 600 may further include a display device 609, an input device 611 (e.g., an alphanumeric keyboard), and a user interface (UI) navigation device 613 (e.g., a mouse). In an example, the display device 609, the input device 611, and the UI navigation device 613 may comprise at least portions of a touch screen display. The machine 600 may additionally include a storage device 620 (e.g., a drive unit), a signal generation device 617 (e.g., a speaker), a network interface device 650, and one or more sensors 615, such as a global positioning system (GPS) sensor, compass, accelerometer, or another sensor type. The machine 600 may include an output controller 619, such as a serial controller or interface (e.g., a universal serial bus (USB)), a parallel controller or interface, or other wired or wireless (e.g., infrared (IR) controllers or interfaces, near field communication (NFC), etc., coupled to communicate or control one or more peripheral devices (e.g., a printer, a card reader, etc.).

The storage device 620 may include a machine-readable medium on which is stored one or more sets of data structures or instructions 624 (e.g., software or firmware) embodying or utilized by any one or more of the techniques or functions described herein. The instructions 624 may also reside, completely or at least partially, within a main memory 603, within a static memory 605, within a mass storage device 607, or within the hardware-based processor 601 during execution thereof by the machine 600. In an example, one or any combination of the hardware-based processor 601, the main memory 603, the static memory 605, or the storage device 620 may constitute machine-readable media.

While the machine-readable medium is considered as a single medium, the term "machine-readable medium" may include a single medium or multiple media (e.g., a centralized or distributed database, and/or associated caches and servers) configured to store the one or more instructions 624.

The term "machine-readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 624 may further be transmitted or received over a communications network 621 using a transmission medium via the network interface device 650 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., the Institute of Electrical and Electronics Engineers (IEEE) 802.22 family of standards known as Wi-Fi®, the IEEE 802.26 family of standards known as WiMax®), the IEEE 802.25.4 family of standards, peer-to-peer (P2P) networks, among others. In an example, the network interface device 650 may include one or more physical jacks (e.g., Ethernet, coaxial, or phone jacks) or one or more antennas to connect to the communications network 621. In an example, the network interface device 650 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Upon reading and understanding the disclosed subject matter, a person of ordinary skill in the art will recognize that, although the disclosed subject matter in described in conjunction with substrate-inspection systems or metrology systems, no such limitation is intended. The use of the disclosed subject matter with substrate-inspection systems or metrology systems is provided to more readily illustrate a possible use of the disclosed subject matter. Therefore, various aspects of the disclosed subject matter can be used readily in many different industries.

As used herein, the term "or" may be construed in an inclusive or exclusive sense. Further, other embodiments will be understood by a person of ordinary skill in the art based upon reading and understanding the disclosure provided. Moreover, the person of ordinary skill in the art will readily understand that various combinations of the techniques and examples provided herein may all be applied in various combinations.

Throughout this specification, plural instances may implement components, operations, or structures described as a single instance. Although individual operations are illustrated and described as separate operations, one or more of the individual operations may be performed concurrently, and, unless otherwise stated, nothing requires that the operations necessarily be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter described herein.

Further, although not shown explicitly but understandable to a skilled artisan, each of the various arrangements, quantities, and number of elements may be varied (e.g., the number of pre-load bearings or the number of load stage actuators). Moreover, each of the examples shown and described herein is merely representative of one possible configuration and should not be taken as limiting the scope of the disclosure.

Although various embodiments are discussed separately, these separate embodiments are not intended to be considered as independent techniques or designs. As indicated above, each of the various portions may be inter-related and each may be used separately or in combination with other embodiments discussed herein. For example, although various embodiments of operations, systems, and processes have been described, these methods, operations, systems, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to ascertain quickly the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

The description provided herein includes illustrative examples, devices, and apparatuses that embody various aspects of the matter described in this document. In the description, for purposes of explanation, numerous specific details are set forth in order to provide an understanding of various embodiments of the matter discussed. It will be evident however, to those of ordinary skill in the art, that various embodiments of the disclosed subject matter may be practiced without these specific details. Further, well-known structures, materials, and techniques have not been shown in detail, so as not to obscure the various illustrated embodiments. As used herein, the terms "about," "approximately," and "substantially" may refer to values that are, for example, within ±10% of a given value or range of values.

THE FOLLOWING NUMBERED EXAMPLES ARE SPECIFIC EMBODIMENTS OF THE DISCLOSED SUBJECT MATTER

Example 1: An embodiment of the disclosed subject matter describes an apparatus to provide motion in at least two linear-axes, each of the at least two linear-axes being substantially orthogonal to one another. The apparatus includes a load stage. A first actuator is coupled to the load stage to provide a linear motion to the load stage in a first direction. A wide-magnet pack is coupled within the first actuator. The wide-magnet pack has a width sufficient to allow movement of the load stage in a direction substantially orthogonal to the first direction. At least one second actuator is also coupled to the load stage to provide at least one of a linear motion and a rotary motion to the load stage in a second direction that is substantially orthogonal to the first direction.

Example 2: The apparatus of Example 1, wherein the first actuator comprises a linear motor.

Example 3: The apparatus of either Example 1 or Example 2, wherein the at least one second actuator comprises a voice-coil motor.

Example 4: The apparatus of either Example 1 or Example 2, wherein the at least one second actuator comprises a linear motor.

Example 5: The apparatus of any one of the preceding Examples, further comprising at least a first set of air bearings coupled to the load stage.

Example 6: The apparatus of any one of the preceding Examples, further comprising at least one third actuator coupled proximate to one edge of the load stage and configured to apply a force transverse to the edge on which the third actuator is coupled, the force to provide a rotational motion to the load stage.

Example 7: The apparatus of any one of the preceding Examples, further comprising at least one back-side pre-load bearing mounted on a portion of the load stage opposite that on which a component is to be mounted to the load stage.

Example 8: The apparatus of any one of the preceding Examples, further comprising at least one bottom-side pre-load bearing mounted on a lower portion of the load stage.

Example 9: The apparatus of Example 8, wherein each of the at least one back-side pre-load bearing and the at least one bottom-side pre-load bearing comprise air bearings.

Example 10: The apparatus of any one of the preceding Examples, further comprising a vacuum air-bearing mounted on a portion of the load stage opposite that on which a component is to be mounted to the load stage.

Example 11: The apparatus of any one of the preceding Examples, further comprising at least one position encoding system to indicate a distance of the linear motion to the load stage in at least the first direction.

Example 12: An embodiment of the disclosed subject matter describes an apparatus to provide motion in at least two linear-axes, each of the at least two linear-axes being substantially orthogonal to one another. The apparatus includes a load stage having a mounting plate and a first linear-motor configured to provide a linear motion to the load stage in a first direction. The first linear-motor includes a magnet pack and a coil-bearing plate. The coil-bearing plate is coupled to the mounting plate of the load stage and is substantially surrounded on at least two sides by the magnet pack. The coil-bearing plate is arranged to move the load stage in at least the first direction via a magnetic field generated within the first linear-motor. The apparatus further includes at least one second actuator coupled to the load stage. The at least one second actuator is to provide at least a linear motion to the load stage in a second direction that is substantially orthogonal to the first direction.

Example 13: The apparatus of Example 12, wherein the magnet pack has a width, in a direction substantially orthogonal to the first direction, sufficient to allow movement of the load stage in a direction substantially orthogonal to the first direction.

Example 14: The apparatus of either of Example 12 or Example 13, wherein the magnet pack is sufficiently wide to accommodate an anticipated amount of movement in the second direction.

Example 15: The apparatus of Example 14, wherein a width of the magnet pack is selected such that the coil-bearing plate is to remain substantially within a magnetic field produced by the magnet pack.

Example 16: The apparatus of any one of the preceding Examples 12 et seq., wherein the at least one second actuator coupled to the load stage is further configured to provide a rotary motion to the load stage.

Example 17: An embodiment of the disclosed subject matter describes an apparatus to provide motion in at least two linear-axes, each of the at least two linear-axes being substantially orthogonal to one another. The apparatus includes a first linear-motor to provide a linear motion in a first direction. The first linear-motor includes a magnet pack and a coil-bearing plate. The coil-bearing plate is substantially surrounded on at least two sides by the magnet pack. The coil-bearing plate is arranged to move in at least the first direction via a magnetic field generated within the first linear-motor.

Example 18: The apparatus of Example 17, wherein the linear motion in the second direction does not require a second linear-motor mounted to the first linear-motor.

Example 19: The apparatus of any one of the preceding Examples 17 et seq., wherein the magnet pack has a width, in a direction substantially orthogonal to the first direction, sufficient to allow movement of the load stage in a direction substantially orthogonal to the first direction.

Example 20: The apparatus of any one of the preceding Examples 17 et seq., wherein the at least one second actuator coupled to the load stage is further configured to provide a rotary motion to the load stage.

Example 21: An embodiment of the disclosed subject-matter describes an apparatus to provide motion to a load stage in a first-direction while simultaneously allowing motion of the load stage in a second-direction and a third-direction. The apparatus includes a shaft to apply a torque to the load stage; one or more z-direction load-stage actuators mechanically coupled to the shaft to adjust a height of the load stage above a substrate. A motion actuator is mechanically coupled to the shaft and located proximate to the one or more z-direction load-stage actuators to apply a force on the shaft.

Example 22. The apparatus of Example 21, further comprising a bell-crank assembly coupled between the motion actuator and the shaft. The bell-crank assembly is configured to supply the force to the shaft to apply the torque to the one or more z-direction load-stage actuators.

Example 23: The apparatus of Example 22, wherein the torque applied to the one or more z-direction load-stage actuators is to provide a substantially uniform force to the load stage in a z-direction and substantially prevent any theta-rotation of the load stage.

Example 24: The apparatus of any one of the preceding Examples, wherein the motion actuator is configured to apply the force on the shaft in a direction substantially transverse to a direction of a force applied to the load stage by the one or more z-direction load-stage actuators.

Example 25: The apparatus of any one of the preceding Examples, further comprising an encoder to determine a difference in linear distance in the first-direction based on a circular-to-linear conversion.

Example 26: The apparatus of any one of the preceding Examples, wherein each of the first-direction, the second-direction, and the third-direction are substantially orthogonal to one another.

Example 27: The apparatus of any one of the preceding Examples, wherein the one or more z-direction load-stage actuators are electrically coupled to an electrical-signal line to control the height of the load stage above the substrate in the first-direction.

Example 28. The apparatus of any one of the preceding Examples, further comprising a first set of air bearings and a second set of air bearings coupled to the load stage to maintain a fixed-distance relationship between a back-side of the load stage and a transfer bridge on which the load stage is positioned.

Example 29: The apparatus of any one of the preceding Examples, further comprising at least one back-side bearing mounted on a portion of the load stage opposite that on which a component is to be mounted to the load stage.

Example 30: The apparatus of any one of the preceding Examples, further comprising a vacuum air-bearing mounted on a portion of the load stage opposite that on which a component is to be mounted to the load stage.

Example 31: An embodiment of the disclosed subject-matter describes an apparatus to provide motion to a load stage in a first-direction while simultaneously allowing motion of the load stage in a second-direction and a third-direction, each of the directions being substantially orthogonal to one another. The apparatus includes a shaft to apply a torque to the load stage; at least one pair of z-direction load-stage actuators mechanically coupled to each other and mounted on opposing ends of the shaft, the at least one pair of z-direction load-stage actuators to adjust a height of the load stage above a substrate; and a motion actuator located between the at least one pair of z-direction load-stage actuators. The motion actuator is configured to apply a force on the shaft in a direction substantially transverse to a direction of a force applied to the load stage by the at least one pair of z-direction load-stage actuators. A bell-crank assembly is coupled between the motion actuator and the shaft. The bell-crank assembly is configured to supply the force to the shaft to apply the torque to the at least one pair of z-direction load-stage actuators.

Example 32: The apparatus of Example 31, wherein the torque applied to the at least one pair of z-direction load-stage actuators is to provide a substantially uniform force to the load stage in a z-direction and substantially prevent any theta-rotation of the load stage.

Example 33. The apparatus of either Example 31 or Example 32, wherein the motion actuator is to apply the force on the shaft in a direction substantially transverse to a direction of a force applied to the load stage by the at least one pair of z-direction load-stage actuators.

Example 34: The apparatus of any one of Example 31 through Example 33, wherein the at least one pair of z-direction load-stage actuators are electrically coupled to an electrical-signal line to control the height of the load stage above the substrate in the first-direction.

What is claimed is:

1. An apparatus to provide motion in at least two linear-axes, each of the at least two linear-axes being substantially orthogonal to one another, the apparatus comprising:
   a load stage;
   a first actuator coupled to the load stage and configured to provide a linear motion to the load stage in a first direction;
   a wide-magnet pack coupled within the first actuator, the wide-magnet pack having a width sufficient to allow movement of the load stage in a direction substantially orthogonal to the first direction; and
   at least one second actuator coupled to the load stage and configured to provide at least one of a linear motion and a rotary motion to the load stage in a second direction that is substantially orthogonal to the first direction.

2. The apparatus of claim 1, further comprising at least one third actuator coupled proximate to one edge of the load stage and configured to apply a force transverse to the edge on which the third actuator is coupled, the force to provide a rotational motion to the load stage.

3. The apparatus of claim 1, further comprising at least one back-side pre-load bearing mounted on a portion of the load stage opposite that on which a component is to be mounted to the load stage.

4. The apparatus of claim 1, further comprising at least one bottom-side pre-load bearing mounted on a lower portion of the load stage.

5. The apparatus of claim 4, wherein each of at least one back-side pre-load bearing and the at least one bottom-side pre-load bearing comprise air bearings.

6. The apparatus of claim 1, further comprising a vacuum air-bearing mounted on a portion of the load stage opposite that on which a component is to be mounted to the load stage.

7. The apparatus of claim 1, further comprising at least one position encoding system to indicate a distance of the linear motion to the load stage in at least the first direction.

8. The apparatus of claim 1, wherein the first actuator comprises a linear motor.

9. The apparatus of claim 1, wherein the at least one second actuator comprises a voice-coil motor.

10. The apparatus of claim 1, wherein the at least one second actuator comprises a linear motor.

11. The apparatus of claim 1, further comprising at least a first set of air bearings coupled to the load stage.

12. An apparatus to provide motion in at least two linear-axes, each of the at least two linear-axes being substantially orthogonal to one another, the apparatus comprising:
    a load stage having a mounting plate;

a first linear-motor configured to provide a linear motion to the load stage in a first direction, the first linear-motor including a magnet pack and a coil-bearing plate, the coil-bearing plate is coupled to the mounting plate of the load stage and is substantially surrounded on at least two sides by the magnet pack, the coil-bearing plate is arranged to move the load stage in at least the first direction via a magnetic field generated within the first linear-motor; and at least one second actuator coupled to the load stage, the at least one second actuator is to provide at least a linear motion to the load stage in a second direction that is substantially orthogonal to the first direction.

13. The apparatus of claim 12, wherein the magnet pack has a width, in a direction substantially orthogonal to the first direction, sufficient to allow movement of the load stage in a direction substantially orthogonal to the first direction.

14. The apparatus of claim 12, wherein the magnet pack is sufficiently wide to accommodate an anticipated amount of movement in the second direction.

15. The apparatus of claim 14, wherein a width of the magnet pack is selected such that the coil-bearing plate is to remain substantially within a magnetic field produced by the magnet pack.

16. The apparatus of claim 12, wherein the at least one second actuator coupled to the load stage is further configured to provide a rotary motion to the load stage.

17. An apparatus to provide motion in at least two linear-axes, each of the at least two linear-axes being substantially orthogonal to one another, the apparatus comprising:

a first linear-motor to provide a linear motion in a first direction, the first linear-motor including a magnet pack and a coil-bearing plate, the coil-bearing plate is substantially surrounded on at least two sides by the magnet pack, the coil-bearing plate is arranged to move in at least the first direction via a magnetic field generated within the first linear-motor.

18. The apparatus of claim 17, wherein the linear motion in a second direction does not require a second linear-motor mounted to the first linear-motor.

19. The apparatus of claim 17, wherein the magnet pack has a width, in a direction substantially orthogonal to the first direction, sufficient to allow movement of a load stage in a direction substantially orthogonal to the first direction.

20. The apparatus of claim 17, wherein at least one second actuator coupled to a load stage is further configured to provide a rotary motion to the load stage.

* * * * *